(12) United States Patent
Dregalla et al.

(10) Patent No.: US 12,551,509 B2
(45) Date of Patent: Feb. 17, 2026

(54) ACELLULAR REGENERATIVE PRODUCTS AND METHODS OF THEIR MANUFACTURE

(71) Applicant: Lucina Patent Holdco, LLC, Loveland, CO (US)

(72) Inventors: Ryan Dregalla, Lyons, CO (US); Leonard R. Duford, Tampa, FL (US); Dean Nistal, Aurora, CO (US); Tracee Gruber, Denver, CO (US)

(73) Assignee: Lucina Patent Holdco, LLC, Loveland, CO (US)

( * ) Notice: Subject to any disclaimer, the term of this patent is extended or adjusted under 35 U.S.C. 154(b) by 586 days.

(21) Appl. No.: 16/043,520

(22) Filed: Jul. 24, 2018

(65) Prior Publication Data

US 2018/0325962 A1 Nov. 15, 2018

Related U.S. Application Data

(63) Continuation-in-part of application No. 14/945,128, filed on Nov. 18, 2015.

(60) Provisional application No. 62/668,903, filed on May 9, 2018.

(51) Int. Cl.
| | |
|---|---|
| *A61K 35/50* | (2015.01) |
| *A61K 47/42* | (2017.01) |
| *A61L 15/40* | (2006.01) |
| *A61L 26/00* | (2006.01) |
| *A61L 27/36* | (2006.01) |
| *A61L 27/60* | (2006.01) |
| A61K 35/35 | (2015.01) |
| A61K 47/36 | (2006.01) |

(52) U.S. Cl.
CPC .............. *A61K 35/50* (2013.01); *A61L 15/40* (2013.01); *A61L 26/0095* (2013.01); *A61L 27/3604* (2013.01); *A61L 27/3616* (2013.01); *A61L 27/3645* (2013.01); *A61L 27/60* (2013.01); A61K 35/35 (2013.01); A61K 47/36 (2013.01); A61K 47/42 (2013.01); A61L 2300/414 (2013.01); A61L 2430/34 (2013.01)

(58) Field of Classification Search
CPC ..... A61K 35/50; A61L 15/40; A61L 27/3604; A61L 26/0095
See application file for complete search history.

(56) References Cited

U.S. PATENT DOCUMENTS

| | | | |
|---|---|---|---|
| 1,699,479 A | 1/1929 | Scott | |
| 3,409,016 A | 11/1968 | Foley | |
| 3,598,122 A | 8/1971 | Zaffaroni | |
| 3,752,158 A | 8/1973 | Kariher | |
| 3,800,792 A | 4/1974 | Mc et al. | |
| 3,814,097 A | 6/1974 | Ganderton et al. | |
| 3,921,636 A | 11/1975 | Zaffaroni | |
| 3,949,073 A | 4/1976 | Daniels et al. | |
| 3,972,995 A | 8/1976 | Tsuk et al. | |
| 3,993,073 A | 11/1976 | Zaffaroni | |
| 3,996,934 A | 12/1976 | Zaffaroni | |
| 3,998,946 A | 12/1976 | Condie et al. | |
| 4,060,081 A | 11/1977 | Yannas et al. | |
| 4,069,307 A | 1/1978 | Higuchi et al. | |
| 4,077,407 A | 3/1978 | Theeuwes et al. | |
| 4,100,022 A | 7/1978 | Ogasa et al. | |
| 4,120,649 A | 10/1978 | Schechter | |
| 4,201,210 A | 5/1980 | Hughes et al. | |
| 4,292,299 A | 9/1981 | Suzuki et al. | |
| 4,305,502 A | 12/1981 | Gregory et al. | |
| 4,308,875 A | 1/1982 | Young | |
| 4,320,201 A | 3/1982 | Berg et al. | |
| 4,347,841 A | 9/1982 | Benyo et al. | |
| 4,361,552 A | 11/1982 | Baur, Jr. | |
| 4,405,616 A | 9/1983 | Rajadhyaksha | |
| 4,476,116 A | 10/1984 | Anik | |
| 4,599,084 A | 7/1986 | Nashef | |
| 4,599,226 A | 7/1986 | Fox, Jr. et al. | |
| 4,650,678 A | 3/1987 | Fuhge et al. | |
| 4,798,611 A | 1/1989 | Freeman, Jr. | |
| 4,801,586 A | 1/1989 | Minaskanian et al. | |
| 4,829,000 A | 5/1989 | Kleinman et al. | |
| 4,837,285 A | 6/1989 | Berg et al. | |

(Continued)

FOREIGN PATENT DOCUMENTS

| | | | | |
|---|---|---|---|---|
| WO | WO-2015134936 A1 | * | 9/2015 | ............. A61K 35/50 |
| WO | 2017049210 A1 | | 3/2017 | |

OTHER PUBLICATIONS

Rajfer Role of Fibrin in the Development of Surgical Adhesions Rev Urol. 2005;7(4):238-239). (Year: 2005).*
Koob et al. Properties of dehydrated human amnion/chorion composite grafts: Implications for wound repair and soft tissue regeneration J Biomed Mater Res Part B: Appl Biomater, 102B: 1353-1362, 2014 (Year: 2014).*
Wilshaw et al. Production of an Acellular Amniotic Membrane Matrix for Use in Tissue Engineering Tissue Engineering vol. 12, No. 8, 2006 (Year: 2006).*
Pryshev, et al., Biomembranes 1860 (2018), pp. 1362-1371.
Behzad, F., et al., "Brief Communication: Sliding Displacement of Amnion and Chorion Following Controlled Laser Wounding Suggests a Mechanism for Short-Term Sealing of Ruptured Membranes", Placenta (1994) vol. 15, 775-778.

(Continued)

*Primary Examiner* — Maria G Leavitt
*Assistant Examiner* — Alexandra F Connors
(74) *Attorney, Agent, or Firm* — Russell Krajec

(57) ABSTRACT

An acellular product may be derived from human placenta and may be used in various scenarios for wound healing. Because the product may be acellular, the product may be processed for storage and transportation with minimal degradation. The product may include various scaffolding such as biomaterials or human tissue, and the scaffolding may be infused with various plasmas and agents. The cell-free treatment may maintain the biological activity of many therapeutic agents found within cells and may possess multiple structural components to support cellular attachment. The structural components or scaffolds may function as a reservoir of highly diffusible chemotactic and cellular-programming factors that may be useful to treat injury and disease.

9 Claims, 10 Drawing Sheets

(56) References Cited

U.S. PATENT DOCUMENTS

| | | |
|---|---|---|
| 4,861,764 A | 8/1989 | Samour et al. |
| 4,886,783 A | 12/1989 | Minaskanian et al. |
| 4,957,742 A | 9/1990 | Knighton |
| 4,973,493 A | 11/1990 | Guire |
| 4,977,897 A | 12/1990 | Hurwitz |
| 5,000,192 A | 3/1991 | Sealfon |
| 5,017,381 A | 5/1991 | Maruyama et al. |
| 5,036,056 A | 7/1991 | Kludas |
| 5,055,298 A | 10/1991 | Kludas |
| 5,075,104 A | 12/1991 | Gressel et al. |
| 5,116,620 A | 5/1992 | Chvapil et al. |
| 5,116,817 A | 5/1992 | Anik |
| 5,118,845 A | 6/1992 | Peck et al. |
| 5,135,915 A | 8/1992 | Czarniecki et al. |
| 5,165,938 A | 11/1992 | Knighton |
| 5,192,744 A | 3/1993 | Bouck et al. |
| 5,196,410 A | 3/1993 | Francoeur et al. |
| 5,219,576 A | 6/1993 | Chu et al. |
| 5,284,655 A | 2/1994 | Bogdansky et al. |
| 5,294,446 A | 3/1994 | Schlameus et al. |
| 5,318,513 A | 6/1994 | Leib et al. |
| 5,336,616 A | 8/1994 | Livesey et al. |
| 5,352,668 A | 10/1994 | Burgeson et al. |
| 5,364,756 A | 11/1994 | Livesey et al. |
| 5,418,222 A | 5/1995 | Song et al. |
| 5,436,135 A | 7/1995 | Tayot et al. |
| 5,437,287 A | 8/1995 | Phillips et al. |
| 5,554,593 A | 9/1996 | Nakaya et al. |
| 5,599,558 A | 2/1997 | Gordinier et al. |
| 5,618,312 A | 4/1997 | Yui et al. |
| 5,622,721 A | 4/1997 | Dansereau et al. |
| 5,665,378 A | 9/1997 | Davis et al. |
| 5,686,105 A | 11/1997 | Kelm et al. |
| 5,698,228 A | 12/1997 | Takai et al. |
| 5,834,232 A | 11/1998 | Bishop et al. |
| 5,837,284 A | 11/1998 | Mehta et al. |
| 5,869,090 A | 2/1999 | Rosenbaum |
| 5,932,205 A | 8/1999 | Wang et al. |
| 5,932,545 A | 8/1999 | Henkin et al. |
| 5,939,323 A | 8/1999 | Valentini et al. |
| 5,948,766 A | 9/1999 | Milan et al. |
| 5,993,844 A | 11/1999 | Abraham et al. |
| 5,997,896 A | 12/1999 | Carr, Jr. et al. |
| 6,042,610 A | 3/2000 | Li et al. |
| 6,046,160 A | 4/2000 | Obi-Tabot |
| 6,096,733 A | 8/2000 | Lubkin |
| 6,124,259 A | 9/2000 | Delmage et al. |
| 6,143,315 A | 11/2000 | Wang et al. |
| 6,152,142 A | 11/2000 | Tseng |
| 6,165,489 A | 12/2000 | Berg et al. |
| 6,203,755 B1 | 3/2001 | Odland |
| 6,371,992 B1 | 4/2002 | Tanagho et al. |
| 6,372,494 B1 | 4/2002 | Naughton et al. |
| 6,391,452 B1 | 5/2002 | Antonsen et al. |
| 6,428,802 B1 | 8/2002 | Atala |
| 6,432,710 B1 | 8/2002 | Boss, Jr. et al. |
| 6,432,712 B1 | 8/2002 | Wolfinbarger |
| 6,448,076 B2 | 9/2002 | Dennis et al. |
| 6,479,064 B1 | 11/2002 | Atala |
| 6,521,179 B1 | 2/2003 | Girardot et al. |
| 6,545,042 B2 | 4/2003 | Sung et al. |
| 6,573,249 B2 | 6/2003 | Lezdey et al. |
| 6,602,711 B1 | 8/2003 | Thomson et al. |
| 6,652,594 B2 | 11/2003 | Francis et al. |
| 6,734,018 B2 | 5/2004 | Wolfinbarger et al. |
| 6,753,181 B2 | 6/2004 | Atala |
| 6,777,231 B1 | 8/2004 | Katz et al. |
| 6,866,686 B2 | 3/2005 | Ollerenshaw et al. |
| 6,923,983 B2 | 8/2005 | Morgan et al. |
| 6,929,801 B2 | 8/2005 | Klose et al. |
| 6,932,983 B1 | 8/2005 | Straub et al. |
| 6,933,326 B1 | 8/2005 | Griffey et al. |
| 6,936,271 B1 | 8/2005 | Oliver et al. |
| 6,946,144 B1 | 9/2005 | Jordan |
| 6,962,814 B2 | 11/2005 | Mitchell et al. |
| 6,986,739 B2 | 1/2006 | Warren et al. |
| 6,998,418 B1 | 2/2006 | Sung et al. |
| 7,186,557 B2 | 3/2007 | Marko |
| 7,217,294 B2 | 5/2007 | Kusanagi et al. |
| 7,311,904 B2 | 12/2007 | Hariri |
| 7,326,571 B2 | 2/2008 | Freyman |
| 7,476,398 B1 | 1/2009 | Doillon et al. |
| 7,494,802 B2 | 2/2009 | Tseng et al. |
| 7,498,040 B2 | 3/2009 | Masinaei et al. |
| 7,498,171 B2 | 3/2009 | Hariri et al. |
| 7,498,412 B2 | 3/2009 | Huang et al. |
| 7,560,276 B2 | 7/2009 | Harmon et al. |
| 7,682,304 B2 | 3/2010 | Heyninck-Jantz et al. |
| 7,682,803 B2 | 3/2010 | Paludan et al. |
| 7,700,090 B2 | 4/2010 | Heidaran et al. |
| 7,727,550 B2 | 6/2010 | Siegal et al. |
| 7,767,452 B2 | 8/2010 | Kleinsek |
| 7,775,965 B2 | 8/2010 | McFetridge |
| 7,871,646 B2 | 1/2011 | Ghinelli |
| 7,927,414 B2 | 4/2011 | Yang et al. |
| 7,928,280 B2 | 4/2011 | Hariri et al. |
| 7,976,836 B2 | 7/2011 | Hariri |
| 7,993,918 B2 | 8/2011 | Paludan et al. |
| 8,034,363 B2 | 10/2011 | Li et al. |
| 8,057,788 B2 | 11/2011 | Hariri |
| 8,057,789 B2 | 11/2011 | Hariri |
| 8,071,135 B2 | 12/2011 | Liu et al. |
| 8,071,376 B2 | 12/2011 | Heidaran |
| 8,075,920 B2 | 12/2011 | Gammelsaeter et al. |
| 8,093,365 B2 | 1/2012 | Wisniewski et al. |
| 8,105,634 B2 | 1/2012 | Liu et al. |
| 8,187,639 B2 | 5/2012 | Tseng et al. |
| 8,263,065 B2 | 9/2012 | Hariri et al. |
| 8,323,701 B2 | 12/2012 | Daniel et al. |
| 8,357,403 B2 | 1/2013 | Daniel et al. |
| 8,367,409 B2 | 2/2013 | Abbot et al. |
| 8,372,437 B2 | 2/2013 | Daniel |
| 8,372,438 B2 | 2/2013 | Daniel et al. |
| 8,372,439 B2 | 2/2013 | Daniel et al. |
| 8,435,788 B2 | 5/2013 | Hariri |
| 8,460,650 B2 | 6/2013 | Edinger et al. |
| 8,460,715 B2 | 6/2013 | Daniel |
| 8,460,716 B2 | 6/2013 | Daniel |
| 8,480,757 B2 | 7/2013 | Gage et al. |
| 8,486,374 B2 | 7/2013 | Tamarkin et al. |
| 8,497,121 B2 | 7/2013 | Yao et al. |
| 8,518,433 B2 | 8/2013 | Kizer et al. |
| 8,518,879 B2 | 8/2013 | Al-Qahtani |
| 8,529,957 B2 | 9/2013 | Turzi et al. |
| 8,545,833 B2 | 10/2013 | Hariri |
| 8,562,972 B2 | 10/2013 | Edinger et al. |
| 8,562,973 B2 | 10/2013 | Edinger et al. |
| 8,580,289 B2 | 11/2013 | Seyedin et al. |
| 8,586,360 B2 | 11/2013 | Abbot et al. |
| 8,617,535 B2 | 12/2013 | Hariri |
| 8,642,092 B2 | 2/2014 | Daniel et al. |
| 8,685,634 B2 | 4/2014 | Boruch |
| 8,703,206 B2 | 4/2014 | Daniel et al. |
| 8,709,493 B2 | 4/2014 | Daniel et al. |
| 8,741,265 B2 | 6/2014 | Tamarkin et al. |
| 8,753,406 B2 | 6/2014 | Lozier et al. |
| 8,753,883 B2 | 6/2014 | Edinger et al. |
| 8,784,499 B2 | 7/2014 | Owens et al. |
| 8,785,389 B2 | 7/2014 | Brown et al. |
| 8,802,651 B2 | 8/2014 | Gwon |
| 8,828,376 B2 | 9/2014 | Zeitlin et al. |
| 8,840,665 B2 | 9/2014 | Young et al. |
| 8,883,210 B1 | 11/2014 | Truncale et al. |
| 8,893,995 B2 | 11/2014 | Taghizadeh et al. |
| 8,895,256 B2 | 11/2014 | Paludan et al. |
| 8,901,078 B2 | 12/2014 | Mezger et al. |
| 8,904,664 B2 | 12/2014 | Pringle et al. |
| 8,926,964 B2 | 1/2015 | Hariri et al. |
| 8,932,643 B2 | 1/2015 | Daniel et al. |
| 8,932,805 B1 | 1/2015 | Brahm |
| 8,940,684 B2 | 1/2015 | Koob |
| 8,945,537 B2 | 2/2015 | Turzi |
| 8,946,163 B2 | 2/2015 | Koob |
| 8,956,862 B2 | 2/2015 | Pal et al. |

(56) References Cited

U.S. PATENT DOCUMENTS

| | | |
|---|---|---|
| 8,961,617 B2 | 2/2015 | Young |
| 8,969,315 B2 | 3/2015 | Abbot et al. |
| 8,980,630 B2 | 3/2015 | Woodbury et al. |
| 9,012,467 B2 | 4/2015 | Stopek |
| 9,040,035 B2 | 5/2015 | Herzberg et al. |
| 9,050,337 B2 | 6/2015 | Kim |
| 9,084,767 B2 | 7/2015 | Daniel et al. |
| 9,089,523 B2 | 7/2015 | Xu et al. |
| 9,102,913 B2 | 8/2015 | Roach et al. |
| 9,119,974 B2 | 9/2015 | Al-Qahtani |
| 9,121,007 B2 | 9/2015 | Zhang et al. |
| 9,132,156 B1 * | 9/2015 | Werber .................. A61Q 19/08 |
| 9,138,318 B2 | 9/2015 | Yao et al. |
| 9,155,799 B2 | 10/2015 | Koob |
| 9,162,011 B2 | 10/2015 | Stilwell et al. |
| 9,175,066 B2 | 11/2015 | Tseng et al. |
| 9,180,145 B2 | 11/2015 | Brown et al. |
| 9,186,382 B2 | 11/2015 | Daniel et al. |
| 9,193,948 B2 | 11/2015 | Nicoll et al. |
| 9,198,568 B2 | 12/2015 | Zeitels et al. |
| 9,198,938 B2 | 12/2015 | Abbot et al. |
| 9,200,253 B1 | 12/2015 | Heidaran et al. |
| 9,205,150 B2 | 12/2015 | Jarrett et al. |
| 9,216,188 B2 | 12/2015 | Zeitels et al. |
| 9,254,302 B2 | 2/2016 | Abbot et al. |
| 9,265,801 B2 | 2/2016 | Daniel |
| 9,271,821 B2 | 3/2016 | Roock et al. |
| 9,272,003 B2 | 3/2016 | Daniel et al. |
| 9,295,753 B1 | 3/2016 | Tello |
| 9,352,003 B1 | 5/2016 | Semler et al. |
| 9,358,320 B2 | 6/2016 | Samaniego et al. |
| 9,364,425 B2 | 6/2016 | Burt |
| 9,370,536 B2 | 6/2016 | Sun et al. |
| 9,375,513 B2 | 6/2016 | Sun et al. |
| 9,446,077 B2 | 9/2016 | Southard et al. |
| 9,446,142 B2 | 9/2016 | Koob |
| 9,463,206 B2 | 10/2016 | Koob et al. |
| 9,463,207 B2 | 10/2016 | Daniel |
| 9,480,549 B2 | 11/2016 | Samaniego |
| 9,498,327 B1 | 11/2016 | Brahm |
| 9,526,770 B2 | 12/2016 | Tseng et al. |
| 9,532,863 B2 | 1/2017 | Hayzlett |
| 9,532,866 B2 | 1/2017 | Kim et al. |
| 9,533,011 B2 | 1/2017 | Daniel et al. |
| 9,549,805 B2 | 1/2017 | Hayzlett et al. |
| 9,585,983 B1 | 3/2017 | Brahm |
| 9,592,254 B2 | 3/2017 | Monteiro et al. |
| 9,598,669 B2 | 3/2017 | Edinger et al. |
| 9,616,093 B2 | 4/2017 | Tabet et al. |
| 9,616,152 B2 | 4/2017 | Samaniego et al. |
| 9,623,051 B2 | 4/2017 | Leach et al. |
| 9,644,177 B2 | 5/2017 | Kim et al. |
| 9,649,341 B2 | 5/2017 | Selem et al. |
| 9,649,408 B1 | 5/2017 | Qing-Qing et al. |
| 9,655,926 B1 | 5/2017 | Prasad |
| 9,655,948 B1 | 5/2017 | Koob et al. |
| 9,662,355 B2 | 5/2017 | Koob et al. |
| 9,682,160 B2 | 6/2017 | Tseng et al. |
| 9,694,106 B2 | 7/2017 | Brown et al. |
| 9,713,629 B2 | 7/2017 | Peterson et al. |
| 9,724,370 B2 | 8/2017 | Tseng et al. |
| 9,725,694 B2 | 8/2017 | Edinger et al. |
| 9,750,771 B2 | 9/2017 | Tseng et al. |
| 9,750,772 B2 | 9/2017 | Tseng et al. |
| 9,757,418 B1 | 9/2017 | Nelson et al. |
| 9,763,868 B2 | 9/2017 | Ueno et al. |
| 9,763,983 B2 | 9/2017 | Zhang et al. |
| 9,770,472 B1 | 9/2017 | Brahm |
| 9,782,436 B2 | 10/2017 | Sun |
| 9,789,137 B2 | 10/2017 | Daniel et al. |
| 9,789,138 B1 | 10/2017 | Brahm et al. |
| 9,795,638 B1 | 10/2017 | Brahm |
| 9,795,639 B1 | 10/2017 | Brahm |
| 9,795,707 B2 | 10/2017 | Samaniego et al. |
| 9,803,176 B2 | 10/2017 | Patel |
| 9,808,491 B2 | 11/2017 | Tseng et al. |
| 9,814,745 B2 | 11/2017 | Wilhelmi et al. |
| 9,814,746 B2 | 11/2017 | Werber et al. |
| 9,821,013 B2 | 11/2017 | McFetridge et al. |
| 9,827,293 B2 | 11/2017 | Koob et al. |
| 9,848,987 B2 | 12/2017 | Badylak et al. |
| 9,855,301 B1 | 1/2018 | Brahm |
| 9,872,937 B2 | 1/2018 | Peterson et al. |
| 9,907,821 B2 | 3/2018 | Harrell |
| 9,920,301 B2 | 3/2018 | Taghizadeh |
| 9,925,221 B2 | 3/2018 | Hariri et al. |
| 9,943,551 B2 | 4/2018 | Koob et al. |
| 9,944,900 B2 | 4/2018 | Gage |
| 9,956,248 B2 | 5/2018 | Tom et al. |
| 9,956,252 B2 | 5/2018 | Tseng et al. |
| 9,981,066 B2 | 5/2018 | Dimitrievska et al. |
| 9,993,506 B1 | 6/2018 | Brahm |
| 10,029,030 B2 | 7/2018 | Koob et al. |
| 10,039,792 B1 | 8/2018 | Brahm |
| 10,052,351 B2 | 8/2018 | Koob |
| 10,071,184 B2 | 9/2018 | Li et al. |
| 10,105,397 B2 | 10/2018 | Morse et al. |
| 10,105,398 B2 | 10/2018 | Morse et al. |
| 10,130,736 B1 | 11/2018 | Semler et al. |
| 10,137,224 B2 | 11/2018 | Peterson et al. |
| 10,167,447 B2 | 1/2019 | Yao et al. |
| 10,206,977 B1 | 2/2019 | Koob et al. |
| 10,226,480 B2 | 3/2019 | Perez et al. |
| 10,232,085 B2 | 3/2019 | Morse et al. |
| 10,245,306 B2 | 4/2019 | Seyedin et al. |
| 10,265,344 B2 | 4/2019 | Tom et al. |
| 10,265,438 B1 | 4/2019 | Brahm |
| 10,271,942 B2 | 4/2019 | Tokish et al. |
| 10,272,116 B2 | 4/2019 | Tom et al. |
| 10,272,119 B2 | 4/2019 | Tseng et al. |
| 10,314,688 B2 | 6/2019 | Shepard et al. |
| 10,335,433 B2 | 7/2019 | Koob |
| 10,363,278 B2 | 7/2019 | Beaudry et al. |
| 10,406,259 B2 | 9/2019 | Daniel |
| 10,426,731 B2 | 10/2019 | Tseng et al. |
| 10,443,038 B2 | 10/2019 | Mandinova et al. |
| 10,449,220 B2 | 10/2019 | Koob |
| 10,485,521 B2 | 11/2019 | Harrell |
| 10,494,607 B2 | 12/2019 | Edinger et al. |
| 10,508,309 B2 | 12/2019 | Neel et al. |
| 10,512,660 B2 | 12/2019 | Fujimiya et al. |
| 10,517,902 B2 | 12/2019 | Horton et al. |
| 10,517,931 B2 | 12/2019 | Koob et al. |
| 10,519,420 B2 | 12/2019 | Harrell |
| 10,555,804 B2 | 2/2020 | Juan, Jr. et al. |
| 10,555,897 B1 | 2/2020 | Brahm |
| 10,555,973 B2 | 2/2020 | Reems et al. |
| 10,568,990 B2 | 2/2020 | Stilwell et al. |
| 10,576,037 B2 | 3/2020 | Harrell |
| 10,576,104 B2 | 3/2020 | Jansen et al. |
| 10,596,202 B2 | 3/2020 | Peterson et al. |
| 10,627,649 B2 | 4/2020 | Juan, Jr. et al. |
| 10,632,155 B2 | 4/2020 | Tseng et al. |
| 10,646,519 B2 | 5/2020 | Tom et al. |
| 10,857,266 B2 | 12/2020 | Koob et al. |
| 10,894,066 B2 | 1/2021 | Beaudry et al. |
| 10,905,800 B1 | 2/2021 | Brahm |
| 11,077,229 B1 | 8/2021 | Brahm |
| 11,090,338 B2 | 8/2021 | Barere et al. |
| 11,130,820 B2 | 9/2021 | Abbot et al. |
| 2002/0103542 A1 | 8/2002 | Bilbo |
| 2002/0111689 A1 | 8/2002 | Hyde |
| 2002/0169452 A1 | 11/2002 | Tormala et al. |
| 2002/0192272 A1 | 12/2002 | Popp |
| 2003/0012687 A1 | 1/2003 | Macphee et al. |
| 2003/0035843 A1 | 2/2003 | Livesey et al. |
| 2003/0054331 A1 | 3/2003 | Fraser et al. |
| 2003/0082780 A1 | 5/2003 | Weigel et al. |
| 2003/0180181 A1 | 9/2003 | Greib et al. |
| 2003/0225355 A1 | 12/2003 | Butler |
| 2004/0029478 A1 | 2/2004 | Planck et al. |
| 2004/0043026 A1 | 3/2004 | Tuan et al. |
| 2004/0126323 A1 | 7/2004 | Shevchuk et al. |
| 2004/0209235 A1 | 10/2004 | Goldstein et al. |

(56) References Cited

U.S. PATENT DOCUMENTS

| | | |
|---|---|---|
| 2005/0019908 A1 | 1/2005 | Hariri |
| 2005/0064391 A1 | 3/2005 | Segal et al. |
| 2005/0076396 A1 | 4/2005 | Katz et al. |
| 2005/0118715 A1 | 6/2005 | Hariri et al. |
| 2005/0143420 A1 | 6/2005 | Parseval et al. |
| 2005/0148034 A1 | 7/2005 | Hariri et al. |
| 2005/0186193 A1 | 8/2005 | Mishra |
| 2005/0276792 A1 | 12/2005 | Kaminski et al. |
| 2005/0287223 A1 | 12/2005 | Peyman |
| 2006/0073592 A1 | 4/2006 | Sun et al. |
| 2006/0078993 A1 | 4/2006 | Phan et al. |
| 2006/0127375 A1 | 6/2006 | Livesey et al. |
| 2006/0147430 A1 | 7/2006 | Sayre et al. |
| 2006/0153815 A1 | 7/2006 | Seyda et al. |
| 2006/0177513 A1 | 8/2006 | Martin et al. |
| 2006/0190017 A1 | 8/2006 | Cyr et al. |
| 2007/0014729 A1 | 1/2007 | Farhat et al. |
| 2007/0015685 A1 | 1/2007 | Balaban |
| 2007/0020225 A1 | 1/2007 | Abramson et al. |
| 2007/0038298 A1 | 2/2007 | Sulner et al. |
| 2007/0074980 A1 | 4/2007 | Bankoski et al. |
| 2007/0110737 A1 | 5/2007 | Mishra |
| 2007/0122906 A1 | 5/2007 | Mishra |
| 2007/0134210 A1 | 6/2007 | Heidaran |
| 2007/0190042 A1 | 8/2007 | Edinger et al. |
| 2007/0202189 A1 | 8/2007 | Ahlfors |
| 2007/0218549 A1 | 9/2007 | Mansbridge |
| 2007/0248575 A1 | 10/2007 | Connor et al. |
| 2007/0269791 A1 | 11/2007 | Takami et al. |
| 2007/0292399 A1 | 12/2007 | Heidaran et al. |
| 2007/0292400 A1 | 12/2007 | Lipton et al. |
| 2007/0292401 A1 | 12/2007 | Harmon et al. |
| 2007/0292910 A1 | 12/2007 | Heidaran et al. |
| 2008/0044848 A1 | 2/2008 | Heidaran |
| 2008/0050346 A1 | 2/2008 | Jimenez et al. |
| 2008/0050814 A1 | 2/2008 | Allickson |
| 2008/0064098 A1 | 3/2008 | Allickson |
| 2008/0102135 A1 | 5/2008 | Ollivier |
| 2008/0108045 A1 | 5/2008 | Ghinelli |
| 2008/0131410 A1 | 6/2008 | Hariri |
| 2008/0131522 A1 | 6/2008 | Liu et al. |
| 2008/0152629 A1 | 6/2008 | Edinger et al. |
| 2008/0181935 A1 | 7/2008 | Lugo et al. |
| 2008/0181967 A1 | 7/2008 | Liu et al. |
| 2008/0193554 A1 | 8/2008 | Dua |
| 2008/0213198 A1 | 9/2008 | Lintner et al. |
| 2008/0213228 A1 | 9/2008 | Edinger et al. |
| 2008/0241211 A1 | 10/2008 | Han et al. |
| 2008/0254126 A1 | 10/2008 | Shimada |
| 2008/0281434 A1 | 11/2008 | Schmidt et al. |
| 2008/0286378 A1 | 11/2008 | Behrens |
| 2009/0004160 A1 | 1/2009 | Park et al. |
| 2009/0024223 A1 | 1/2009 | Chen et al. |
| 2009/0053805 A1 | 2/2009 | Hariri |
| 2009/0054350 A1 | 2/2009 | Tayot et al. |
| 2009/0069843 A1 | 3/2009 | Agnew |
| 2009/0098214 A1 | 4/2009 | Nanbu |
| 2009/0104164 A1 | 4/2009 | Zhang et al. |
| 2009/0130162 A2 | 5/2009 | Pathak et al. |
| 2009/0136471 A1 | 5/2009 | Heidaran et al. |
| 2010/0080779 A1 | 4/2010 | Smith et al. |
| 2010/0080840 A1 | 4/2010 | Cho et al. |
| 2010/0098924 A1 | 4/2010 | Hsiao et al. |
| 2010/0104539 A1 | 4/2010 | Daniel et al. |
| 2010/0143312 A1 | 6/2010 | Hariri et al. |
| 2010/0172830 A1 | 7/2010 | Heidaran |
| 2010/0209398 A1 | 8/2010 | Tankovich et al. |
| 2010/0256774 A1 | 10/2010 | Wang et al. |
| 2010/0272782 A1 | 10/2010 | Owens et al. |
| 2010/0318048 A1 | 12/2010 | Hoefinghoff et al. |
| 2011/0165676 A1 | 7/2011 | Hopkins |
| 2011/0182957 A1 | 7/2011 | Nicoll et al. |
| 2011/0189301 A1 | 8/2011 | Yang et al. |
| 2011/0206776 A1 | 8/2011 | Tom et al. |
| 2011/0208300 A1 | 8/2011 | Juan, Jr. et al. |
| 2011/0212063 A1 | 9/2011 | Tom et al. |
| 2011/0212064 A1 | 9/2011 | Jansen et al. |
| 2011/0212065 A1 | 9/2011 | Jansen et al. |
| 2011/0212158 A1 | 9/2011 | Tom et al. |
| 2011/0223209 A1 | 9/2011 | Kuijer et al. |
| 2011/0274665 A1 | 11/2011 | Maslowski |
| 2012/0003296 A1 | 1/2012 | Shantha et al. |
| 2012/0010708 A1 | 1/2012 | Young et al. |
| 2012/0010727 A1 | 1/2012 | Young et al. |
| 2012/0020933 A1 | 1/2012 | Young et al. |
| 2012/0035743 A1 | 2/2012 | Young et al. |
| 2012/0035744 A1 | 2/2012 | Young et al. |
| 2012/0053690 A1 | 3/2012 | Frank |
| 2012/0136322 A1 | 5/2012 | Alster et al. |
| 2012/0141399 A1 | 6/2012 | You et al. |
| 2012/0141433 A1 | 6/2012 | Tankovich et al. |
| 2012/0189586 A1 | 7/2012 | Harrell |
| 2012/0263731 A1 | 10/2012 | Fraunhofer et al. |
| 2012/0315259 A1 | 12/2012 | Friedlander |
| 2013/0012446 A1 | 1/2013 | Sierra-Honigmann et al. |
| 2013/0084314 A1 | 4/2013 | Horton et al. |
| 2013/0095061 A1 | 4/2013 | Cohen et al. |
| 2013/0144128 A1 | 6/2013 | Juan, Jr. et al. |
| 2013/0172829 A1 | 7/2013 | Badawi |
| 2013/0209524 A1 | 8/2013 | Young |
| 2013/0211502 A1 | 8/2013 | Young |
| 2013/0211504 A1 | 8/2013 | Young |
| 2013/0211511 A1 | 8/2013 | Young |
| 2013/0236506 A1 | 9/2013 | Young |
| 2013/0289724 A1 | 10/2013 | Young |
| 2013/0344162 A1 | 12/2013 | Morse et al. |
| 2014/0017280 A1 | 1/2014 | Daniel et al. |
| 2014/0023723 A1 | 1/2014 | Leach et al. |
| 2014/0024117 A1 | 1/2014 | Kim et al. |
| 2014/0052247 A1 | 2/2014 | Daniel et al. |
| 2014/0099383 A1 | 4/2014 | Maslowski et al. |
| 2014/0106447 A1 | 4/2014 | Brown et al. |
| 2014/0121612 A1 | 5/2014 | Rubin et al. |
| 2014/0212390 A1 | 7/2014 | Tabet, Jr. et al. |
| 2014/0255508 A1 | 9/2014 | Morse et al. |
| 2014/0271728 A1 | 9/2014 | Koob et al. |
| 2014/0295554 A1 | 10/2014 | Kim et al. |
| 2014/0302162 A1 | 10/2014 | Morse et al. |
| 2014/0336600 A1 | 11/2014 | Harrell |
| 2014/0342015 A1* | 11/2014 | Murphy ............ A61L 26/0076 424/582 |
| 2014/0343688 A1 | 11/2014 | Morse et al. |
| 2015/0010506 A1 | 1/2015 | Jansen et al. |
| 2015/0010610 A1 | 1/2015 | Tom et al. |
| 2015/0025366 A1 | 1/2015 | Harrell |
| 2015/0037436 A1 | 2/2015 | Huang et al. |
| 2015/0086634 A1 | 3/2015 | Koob et al. |
| 2015/0110892 A1 | 4/2015 | Gammelsaeter et al. |
| 2015/0151858 A1 | 6/2015 | Turzi |
| 2015/0157761 A1 | 6/2015 | Samaniego et al. |
| 2015/0190279 A1 | 7/2015 | Acharya et al. |
| 2015/0246072 A1 | 9/2015 | Bhatia et al. |
| 2015/0273111 A1 | 10/2015 | Owens et al. |
| 2015/0307844 A1 | 10/2015 | Sturm |
| 2015/0320906 A1 | 11/2015 | Broussard |
| 2015/0328264 A1 | 11/2015 | Lucey et al. |
| 2015/0335686 A1 | 11/2015 | Spencer et al. |
| 2015/0361390 A1 | 12/2015 | Gho |
| 2016/0022695 A1 | 1/2016 | Reich et al. |
| 2016/0129154 A1 | 5/2016 | Hopkinson et al. |
| 2016/0206550 A1 | 7/2016 | Balasubramanian et al. |
| 2016/0220479 A1 | 8/2016 | During et al. |
| 2016/0263280 A1 | 9/2016 | Harrell |
| 2016/0287750 A1 | 10/2016 | Britt |
| 2017/0027993 A1 | 2/2017 | Ichim |
| 2017/0056479 A1 | 3/2017 | Bhatia et al. |
| 2017/0136070 A1 | 5/2017 | Dregalla |
| 2017/0136150 A1 | 5/2017 | Burke |
| 2017/0281837 A1 | 10/2017 | Jones |
| 2018/0008649 A1 | 1/2018 | Aberman et al. |
| 2018/0017577 A1 | 1/2018 | Franco |
| 2018/0055622 A1 | 3/2018 | Tokish et al. |
| 2018/0250343 A1 | 9/2018 | Reems et al. |
| 2018/0256648 A9 | 9/2018 | Meiron et al. |

(56) References Cited

U.S. PATENT DOCUMENTS

| | | |
|---|---|---|
| 2018/0344900 A9 | 12/2018 | Brown et al. |
| 2019/0054125 A1 | 2/2019 | Kihm |
| 2019/0105351 A9 | 4/2019 | Kramer et al. |
| 2019/0105352 A9 | 4/2019 | Brown et al. |
| 2019/0177684 A1 | 6/2019 | Ha et al. |
| 2019/0274975 A1 | 9/2019 | Ramamurthi et al. |
| 2020/0069739 A1 | 3/2020 | Tom et al. |

OTHER PUBLICATIONS

Bourne, Gordon, "The Foetal Membranes. A Review of the Anatomy of Normal Amnion and Chorion and Some Aspects of Their Function", Postgrad. Med. J. (1962), v38, 193-201.

Bryant-Greenwood, G. D., "The Extracellular Matrix of the Human Fetal Membranes: Structure and Function", Placenta (1998), 19, 1-11.

Gratacos, E., et al., "A Histological Study of Fetoscopic Membrane Defects to Document Membrane Healing", Placenta (2006) 27, 452-456.

Meinert, Mette, et. al., "Proteoglycans and Hyaluronan in Human Fetal Membranes", Am. J. Obstet. Gynecol, 2001.

Ockleford, Colin, et. al., "Micro-trabeculae, Macro-plaques, or Mini-basement Membranes in Human Term Fetal Membranes?" Phil. Trans. R. Soc. Lond. B (1993) 342, 121-136.

Pyrshev, et al, Biomembranes 1860 (2018) pp. 1362-1371.

Oxford Reference, Definition, "Extraembryonic Coelum", https://www.oxfordreference.com/view/10.1093/oi/authority.2011080, viewed Jun. 2, 2022.

Parry, et.al., Premature Rupture of the Fetal Membranes, New England Journal of Medicine, Mar. 5, 1998, 663-670.

Wikilectures.ed, "Scaffolds in tissue engineering", https://www.wikilectures.eu/w/Scaffolds_in_tissue_engineering, visited Sep. 5, 2022.

\* cited by examiner

ACELLULAR REGENERATIVE PRODUCTS AND METHODS OF THEIR MANUFACTURE

RELATED APPLICATIONS

This application is a continuation-in-part (CIP) of U.S. utility application Ser. No. 14/945,128 filed on 18 Nov. 2015; the contents of which is hereby incorporated by reference. The new matter of this CIP further claims the benefit of priority to U.S. provisional patent application Ser. No. 62/668,903 filed on 9 May 2018; the contents of which are likewise incorporated by reference.

FIELD OF THE INVENTION

The disclosure relates generally to the field of acellular regenerative products, methods of their manufacture, and use in treatment.

BACKGROUND

Human placental membrane, such as amniotic membrane or tissue, has been used for various types of reconstructive surgical procedures since the early 1900s. The membrane can serve as a substrate material, more commonly referred to as a biological dressing or graft patch. Typically, such membrane is either frozen or dried for preservation and storage until needed for surgery, and is in the form of a sheet of material, which may have been processed through thinning or chemical treatments, including adding growth promoters or other biological agents. Several drawbacks of using large intact membranes are non-optimal wound coverage, adhesion, and release of factors into relevant tissues, as well as reduced production efficiency and storage stability.

Due to the drawbacks of intact membranes, cell-based treatments have also been used. These treatments take placental membranes and extract intact cells, stabilizing them for future applications, e.g. wound treatment. However, conventional cell treatments, such as recovered stem cells and placental cells, have low effectiveness because it is difficult to extract, maintain, and deliver viable whole cells in a medical context. In many cases, the cells form a barrier between key therapeutic cellular agents and a wound site.

SUMMARY

An acellular product may be derived from human placenta and may be used in various scenarios for wound healing. Because the product may be acellular, the product may be processed for storage and transportation with minimal degradation. The product may include various scaffolding such as biomaterials or human tissue, and the scaffolding may be infused with various plasmas and agents. The cell-free treatment may maintain the biological activity of many therapeutic agents found within cells and may possess multiple structural components to support cellular attachment. The structural components or scaffolds may function as a reservoir of highly diffusible chemotactic and cellular-programming factors that may be useful to treat injury and disease. In many cases, fibrinogen may be absent, which may reduce scarring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5A depicts the diffusion of proteins into amniotic fluid storage media from: a) a raw, unprocessed, intermediate layer product; b) a rinsed intermediate layer product; and c) an impregnated intermediate layer product. The figure shows comparable protein diffusion and stabilization for all three products. FIG. 5B depicts the quantity of proteins diffused into water for the same three products after 30 minutes, 90 minutes, and 270 minutes. The figure shows an increased diffusion rate of proteins from the impregnated intermediate layer product comparatively. Based on FIGS. 5A and 5B, the impregnation techniques described herein result in an impregnated scaffold having super-physiological levels of proteins, at least some of which are primed for immediate release into the wound bed.

DETAILED DESCRIPTION

Overview

Figure 1:
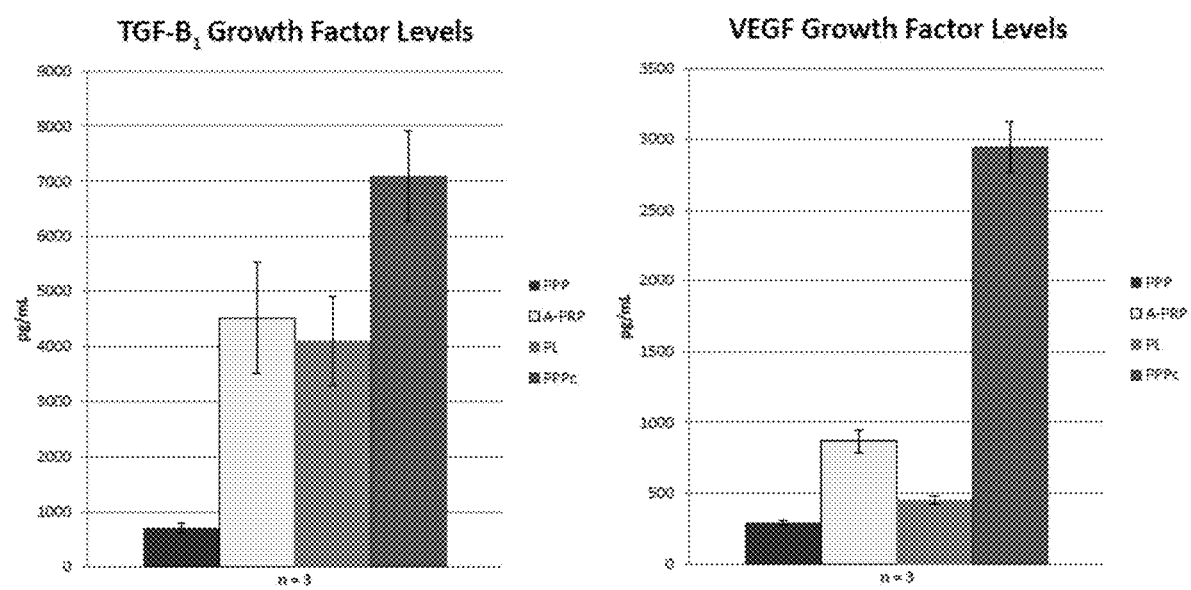
FIG. 1 depicts the effect of removal of water content from platelet poor plasma (PPP) to 10% of the original volume (PPPc), with increased pg/mL of growth factors TGF-B1 and VEGF.

An acellular product may be derived from human placenta and may be used in various scenarios for wound healing. Because the product may be acellular, the product may be processed for storage and transportation with minimal degradation. The product may include various scaffolding such as biomaterials or human tissue, and the scaffolding may be infused with various plasmas and agents. The cell-free treatment may maintain the biological activity of many therapeutic agents found within cells. The product may possess multiple structural components to support cellular attachment, and these structural components or scaffolds may function as well as a reservoir of highly diffusible chemotactic and cellular-programming factors that may be useful to treat injury and disease. In many cases, fibrinogen may be absent, which may reduce scarring.

Scaffolds may be selected for a number of properties, such as biocompatibility, biodegradability, mechanical properties, and architectural properties such as degree of porosity. Exemplary scaffolds include human extracellular matrix derived from amniotic cells, which may contain a favorable substrate for cell migration and subsequent wound repair. One example of scaffolds may comprise the intermediate layer of an amniotic membrane. Other exemplary scaffolds are natural polymer scaffolds, synthetic scaffolds such as those made from synthetic polymers, and ceramic scaffolds.

The scaffold may be biocompatible with human cells, and may allow cells to adhere, function normally, and migrate through the surface and into the structure of the scaffold. Scaffolds may also be biodegradable within the body, which may allow the body's cells to eventually replace the foreign scaffold with extracellular components appropriate to the specific local cell types. Various scaffolds may provide several functions, including maintaining growth factors in a stable conformation, supplying a platform for progenitor cell interaction, maintaining hydration of a wound-bed, mitigating fibrotic cell-type interaction, aiding in tissue formation and contractile collagen formation, as well as other functions.

Scaffolds may be infused with plasmas that may have super-physiological levels of natively interacting growth factors. Plasmas may be selected for a number of properties, such as including developmental components and factors. Plasmas may be human, animal, or of other composition. Plasmas may be derived from developmental tissues such as amniotic tissues, or may be derived from other tissues, such as blood. Plasmas may contain non-scaffold components. These components may include a pool of free-state factors that may diffuse into the wound bed. These factors may include growth factors or other factors that may promote or may accelerate wound healing.

The process of generating the product may maintain many of the proteins, peptides, saccharides and anabolic free-state lipids in non-cross-linked, non-denatured states while mitigating the toxicity of unwanted solutes or salts. The product may or may not contain additives such as dimethyl sulfoxide (DMSO) or various detergents. Many processing sequences may not include a freezing step and may not be lyophilized.

Methods of manufacturing an acellular product may include processing an amniotic serum separately from processing an amniotic membrane, and combining the processed products. Methods may include removing residual cell content from a membrane, adding an amniotic fluid to create a suspension, and morselizing the membrane. In some embodiments, water content may be removed through centrifugation or other process.

The product's combination of factors may trigger local progenitor cells of injured tissue to respond to injury as a "developmental-void", and the product may reduce inflammatory responses, fibrosis and scar tissue while accelerating wound closure with native soft tissue. This may give an advantage not only in dermal tissue repair but also in the repair of other soft tissues, including cornea, muscle, tendon and ligaments. In some embodiments, this may promote skin healing, and may be useful in cosmetic surgery, reconstructive surgery, treatment of burn wounds or other uses. In other embodiments, the product may be used to treat joint or bone ailments, and may be useful in treatment of arthritic conditions, fractures, or other ailments. The product may provide advantages in ease of use and application to wound-beds, simple storage requirements, and versatility during delivery, which may include solid, gel or liquid forms.

The plasma portion and particulate biological membrane portion may be derived from human tissue. When derived from human tissue, the plasma portion may be human plasma, and may comprise extracellular matrix or an amniotic plasma. The particulate biological membrane may comprise human developmental tissue, and may be a human amniotic membrane.

The product may comprise one or more adjuvant factors. These factors may be, for example, soluble or insoluble compounds found in the plasma, such as growth factors.

In some embodiments, the product may contain substantially no fibrinogen or fibrin.

The scaffold may comprise material from an amniotic membrane intermediate layer. This intermediate layer, also referred to as the spongy layer, is defined in the art as a gelatinous structure that exists between the amnion and chorion membrane. This material may also include amnion, chorion, or a mixture thereof. This particulate human amniotic membrane intermediate layer may be impregnated with human plasma-derived proteins.

The products can be in various forms, and in some embodiments are dry-solids. In some embodiments, the dry-solid is capable of gelling upon contact with water.

A method of manufacturing an acellular product may include processing an amniotic serum, processing an amniotic membrane, and combining the processed products. In some embodiments, processing an amniotic serum may comprise obtaining an amniotic serum, mechanically separating the serum into fractions, and isolating the serum fraction from the cellular fraction.

In other embodiments, processing the amniotic membrane may comprise obtaining an amniotic membrane, determining that the chorion may be completely or substantially removed, optionally removing any additional chorion, removing residual cell content, adding an amniotic fluid to create a suspension, and morselizing the membrane.

The process may additionally comprise adding material from an amniotic membrane intermediate layer. In other embodiments, the intermediate layer alone may be used as the amniotic membrane portion in the composition. In yet other embodiments, the supernatant suspension of the combined product may be removed, and any remaining water content may be removed through centrifugation or other process.

Methods of treating disease and injury may use the product to promote skin healing, and is useful in cosmetic surgery, reconstructive surgery, the treatment of burn wounds, or other dermal uses. The product may be used to treat joint or bone ailments, and may be useful in arthritic conditions, fractures, or other orthopedic uses. In some embodiments, a gelling form factor allows improved treatment of deep and narrow wounds.

The following definitions are used within this specification and claims:

"Placental tissue" means a tissue derived from a placenta, whether in whole or in part. Placental tissue may include, for example, chorion, amnion, a chorion and amniotic membrane, such as an amniochorion, Wharton's jelly, umbilical cord, placental cotyledons, intermediate layer, or combinations thereof. The placental tissue may also be dissected, digested, or otherwise treated to remove portions, membranes, or structures.

"Placental cells" refer to any cells that may be obtained from a placenta, and may include, for example, mesenchymal stem cells, endometrial stromal cells, placenta-derived mesenchymal progenitor cells, placental mesenchymal stem cells, fibroblasts, epithelial cells, macrophages, and the like.

"Growth factor" means any factor or factors contributing to cellular or bodily growth, repair, or maintenance, and includes, without limitation, angiogenic factors, chemokines, cytokines, growth hormones, growth signals, protease, protease inhibitor, or matrix components. Exemplary growth factors include matrix metalloproteinases, tissue inhibitors of metalloproteinases, thrombospondins, transforming growth factors, fibroblast growth factors, platelet-derived growth factors, human growth factors, vascular endothelial growth factors, fibronectin, interleukins and interleukin receptors, angiogenins/angiopoietins, and insulin-like growth factors and insulin-like growth factor-binding proteins. Additional classes of proteins may also be considered growth factors, and are included herein without limitation.

"Acellular" means materials and mixtures with significantly reduced intact cell content. For example, acellular as applicable to plasma may indicate low or no cellular content as compared to commonly available isolated red blood cell plasma. Acellular products may be generated by any means known in the art, such as one or more of mechanical or chemical lysis followed by a process such as centrifugation and supernatant removal. Acellular products may include some intact cells or remnants of cells, however, the effective agents within the product may be predominantly acellular components.

"Particulate" means any matter in particulate form or subjected to a process for generating said matter. As specifically applied to biological membranes and other components, particulate refers to material that may have been significantly altered in structure through mechanical processes such as cutting, fracturing, or perforation, chemical processes, or other processing, resulting in material comprising an increased number of smaller fragments.

"Biological membrane" and "membrane" means any enclosing or separating membrane that may act as a selectively permeable barrier within an organism, and may also be referred to as a biomembrane. In some examples, the biological membrane may be derived from human reproductive tissue, such as a placenta. Such tissue may be of any suitable origin, e.g. human or porcine, without limitation. In some embodiments, the membrane may be a developmental membrane, and may be a placental membrane.

"Plasma" means a liquid component of cells as known in the art, for example amniotic cells or blood cells, and may comprise the extracellular matrix of these cells. In some embodiments, the plasma may be derived from blood cells and/or the extracellular matrix thereof, and may be a human or other plasma. In other embodiments, the plasma may be derived from amniotic cells and/or the extracellular matrix thereof, and may be a human or other plasma, and such embodiments may use the term "amniotic serum" or "amniotic fluid". Typical plasma content may include various proteins and other components, for example serum albumins, growth factors, globulins, fibrinogen, glucose, clotting factors, hormones, electrolytes, and carbon dioxide. Plasma may be generated by any method known in the art, and in typical embodiments may be a human blood plasma. Amniotic plasma may contain particularly useful components in some acellular products.

"Scaffold" means any structure that may be capable of acting as a porous structural component for use in a biomedical product, and may be of biological or non-biological origin. Scaffolds may be selected for a number of properties, such as biocompatibility, biodegradability, mechanical properties, and architectural properties such as degree of porosity. The scaffold may be biocompatible with human cells, and may allow cells to adhere, function normally, and migrate through the surface and into the structure of the scaffold. Scaffolds may also be biodegradable within the body, which may allow the body's cells to eventually replace the foreign scaffold with extracellular components appropriate to the specific local cell types. Exemplary scaffolds provided herein include human extracellular matrix derived from amniotic cells, which may contain a favorable substrate for cell migration and subsequent wound repair. One example of scaffolds may comprise the intermediate layer of an amniotic membrane. Other exemplary scaffolds are natural polymer scaffolds, synthetic scaffolds such as those made from synthetic polymers, and ceramic scaffolds.

Extracellular-Matrix Directed Treatments

Extracellular matrix may be a network of highly organized connective proteins, and is often referred to as a scaffold. The extracellular matrix provides tissues and organs with their native mechanical characteristics, such as elasticity and density. Biologically, the extracellular matrix may be the structure that interact with the resident cells of a tissue, and may provide the signal that a cell is in the proper location for its purpose. Extracellular matrix may also bind growth factors that may be produced by the resident cells. The growth factors may have many effects, and may provide a cue that allows resident cell maintenance, function, and growth. Under normal conditions, the extracellular matrix may be a highly organized structure that may bind resident cells, but may also allow the resident cells to migrate to some extent.

When an extracellular matrix is damaged, non-native factors may be introduced to the environment via blood perfusion, and specific cell types may be activated to respond to the damage. The introduction of non-native factors and cells may reduce the ability of the area to return to a pre-injury state. In many cases, scar tissue may form.

In a normal wound healing process, homeostasis may be followed by inflammation, fibroblast-based proliferation, maturation into scar tissue, and finally slow remodeling of the scar tissue. Homeostasis may be achieved when active bleeding stops. Inflammation may be caused by the migration of white blood cells in to the site to clear any pathogens, such as bacteria. Proliferation may happen when fibroblasts migrate to the site and divide and spread out across the wound and are stimulated by the fibrin matrix and may produce rigid collagens.

Maturation may then happen, with fibroblasts pulling on collagen fibers to contract and close the wound, causing de-vascularization and active remodeling of the collagen network, forming scar tissue. On a more detailed level, the damage response may involve the creation of greater amounts of fibrin, which may form a much more tightly-woven extracellular matrix. Non-native cells may also be introduced into the matrix. The tighter extracellular matrix may be small enough to bind platelets and prevent red blood cell loss, stopping bleeding, but may signal scar formation.

Scar tissue may have a number of undesirable properties, mostly attributed with its inability to function as an original local cell, and its varying structural properties. When scarring is sufficiently debilitating towards normal function, a wound may have to be additionally surgically altered to restore function, resulting in additional treatment risk and expense.

Extracellular matrix-directed treatments may attempt to prevent or mitigate the cascade that causes scar tissue formation. In some cases, such treatments may tend to accelerate conversion of scar tissue into functional tissue.

A scaffold-directed wound repair may use human developmental tissue to facilitate a developmental response by, in some cases, impregnating tissues with human developmental proteins to attract and activate regenerative cells. Such a treatment may saturate natural interaction sites on the tissue with plasma factors to beyond natural physiological levels (super saturated), which may accelerate healing response. In some embodiments, the inclusion of additional diffusible factors such as growth factors, cytokines, chemokines, and other molecule classes, may strongly influence the overall course of wound healing. Further, in some embodiments, the absence of fibrin and fibrinogen in the final product may reduce inflammation and scarring, thereby inhibiting the damage response that may lead to scar tissue formation.

The coupling of scaffold and plasma sources may cause a native interaction that may have tremendous implications for wound-healing. Saturating the growth factor binding sites within the scaffold with the free substrates of the plasma may have multiple additive effects. The result of using the techniques described herein may minimize post-trauma complication such as infection, an enhanced rate of recovery, and the redevelopment of functional tissue with significantly reduced amounts of scar tissue.

Acellular Product and Treatment

The acellular product comprises a plasma portion and a biological membrane portion. In many cases, the biological membrane portion may be particulated and impregnated with the plasma portion. In some embodiments, the biological membrane may be derived from developmental tissue, and in some embodiments it may be derived from human tissue.

The general properties and benefits of using human amniotic membranes in treatment include improved wound stabilization, which is believed to be observed because of the non-specificity of the cells and components found in the amniotic membranes. This may mitigate undesirable immune responses that may slow down healing and may contribute to scar tissue.

The particulated amniotic membrane may be delivered as a liquid, gel, or powder. These forms offer the medical professional several ways of improving wound penetration and coverage. The particulated membrane products can be relatively stable and easy to transport and use. Additionally, particulating the amniotic membrane may not significantly damage structural components, leaving the components as still easily recruited for use in wound healing.

In some embodiments, the plasma portion may be derived from human tissue, and in typical embodiments the plasma may be human or other animal's blood or amniotic plasma. The concentration of proteins and other factors in plasma may provide a natural blueprint for specific physiological responses.

Previous generation products may suffer from their inclusion of factors such as fibrinogen, which may promote scar tissue formation, reducing or eliminating the effectiveness of treatments incorporating a plasma portion. In some embodiments, the products may be substantially free of fibrin and fibrinogen.

FIG. 1 shows the effect of water removal from plasma, illustrating some of the advantages with respect to increased growth factor concentration. Specifically, water content is inversely related to growth factor levels (pg/mL). Plasma products shown range in processing level from platelet poor plasma (PPP) to platelet rich plasma (A-PRP), platelet lysate (PL), and platelet poor plasma that has water levels reduced to 10% of the original content (PPPc). The method used to remove water content in these samples was lyophilization. The effect of water removal from plasma to 10% of the original content increases the concentration of TGF-B1 and VEGF approximately 9-10 fold. This also decreases the volume of plasma compositions, making them more useful for treatments.

Lyophilization or freeze-drying is used in regenerative medicine techniques to reduce the water content of plasma samples, for example in the activated platelet (A-PRP) and platelet lysate (PL) samples. However, activated platelets and platelet lysates are primary contributors to the inefficiency of previous products and methods, contributing to scarring and poor wound remodeling.

Figure 2:
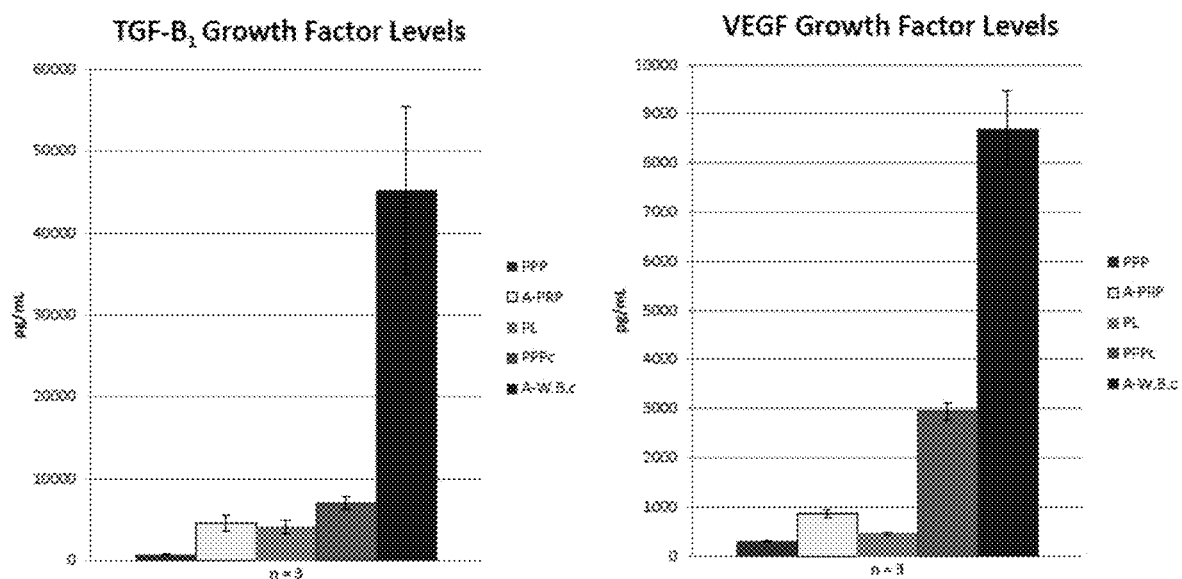
FIG. 2 depicts the effect of activation of whole blood or platelet rich plasma with thrombin followed by the removal of water content from platelet poor plasma to 10% of the original volume (A-W.B.c), with further increased pg/mL of growth factors TGF-B1 and VEGF.

FIG. 2 depicts the thrombin activation of platelet poor plasma reduced in water content by lyophilization to 10% of the original volume (A-W.B.c). The large bar indicates high levels of thrombin. While lyophilization techniques further concentrate growth factors, thrombin takes a primary role in the undesirable clotting and immune responses seen when plasma is administered. Products herein may achieve high concentrations of growth factors while avoiding inclusion of platelets and platelet lysates that may contribute to thrombin activation.

Centrifugation may remove fibrin, fibrinogen, and other cellular content from the product. Centrifugation may concentrate desirable growth factors while removing fibrin/fibrinogen and any cellular content that might be present in a plasma sample. Thus, centrifugation processing of the product may remove the pro-inflammatory or clotting factors and may deliver a high concentration of growth factors.

The combination of the morselized membrane and plasma portions may have synergistic effects that aid in treatment. Specifically, impregnating the scaffold (membrane) sites with factors found in plasma may provide several benefits. One such benefit may be that the product may have a two-stage diffusion. Upon delivery to a treatment site, such as a wound, free factors may be immediately released into the site, while others remain in the scaffold. Initial factor delivery may aid in immediate wound treatment by preventing clinically-negative immune responses and promoting cellular recruitment and healing. Slower factor delivery from the scaffold may continue to support cellular recruitment and healing, and can extend the time over which such factors are available at the wound site. Finally, factors remaining in the scaffold fragments may be later utilized by migrating cells, contributing to further wound healing and remodeling. In some embodiments, different factors may be provided at each release stage.

In some embodiments, the product may have the ratio of 0.01-3.0 mL amniotic serum per square centimeter of amniotic membrane. The surface area of the amniotic membrane may be measured prior to particulation or other processing. This ratio may saturate or impregnate the native binding sites on the scaffold to their complementary growth factors, as well as may provide residual factors in an unbound, free state which will be subject to diffusion at the time of application.

In a typical embodiment, the processed plasma amniotic serum may be added to the micronized amniotic membrane at a ratio of 0.01-0.1 mL plasma per square centimeter of amniotic membrane. In a specific embodiment, the processed plasma may be added to the micronized amniotic membrane at approximately 0.5 mL plasma per square centimeter of amniotic membrane.

This ratio may contribute to the improved effectiveness of the product by both ensuring saturation of the membrane in later steps and providing a different set of factors that synergistically aid in the desirable cellular processes.

Figure 3A:
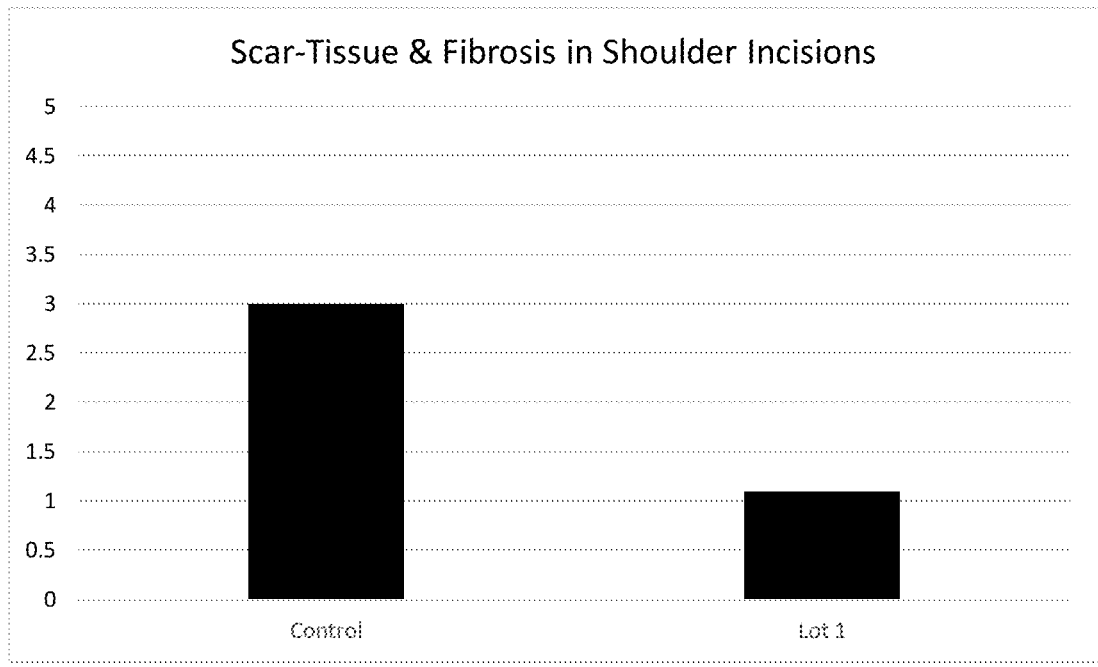
FIG. 3A depicts a histological analysis of a porcine study treating porcine dermal incision injuries with the product having 0.5 mL amniotic fluid per square centimeter amniotic membrane. Full thickness dermal regeneration and reductions in scar tissue and fibrosis were observed, with significant difference from sutured, non-product controls at both 2 and 10 days post operation.
Figure 3B:
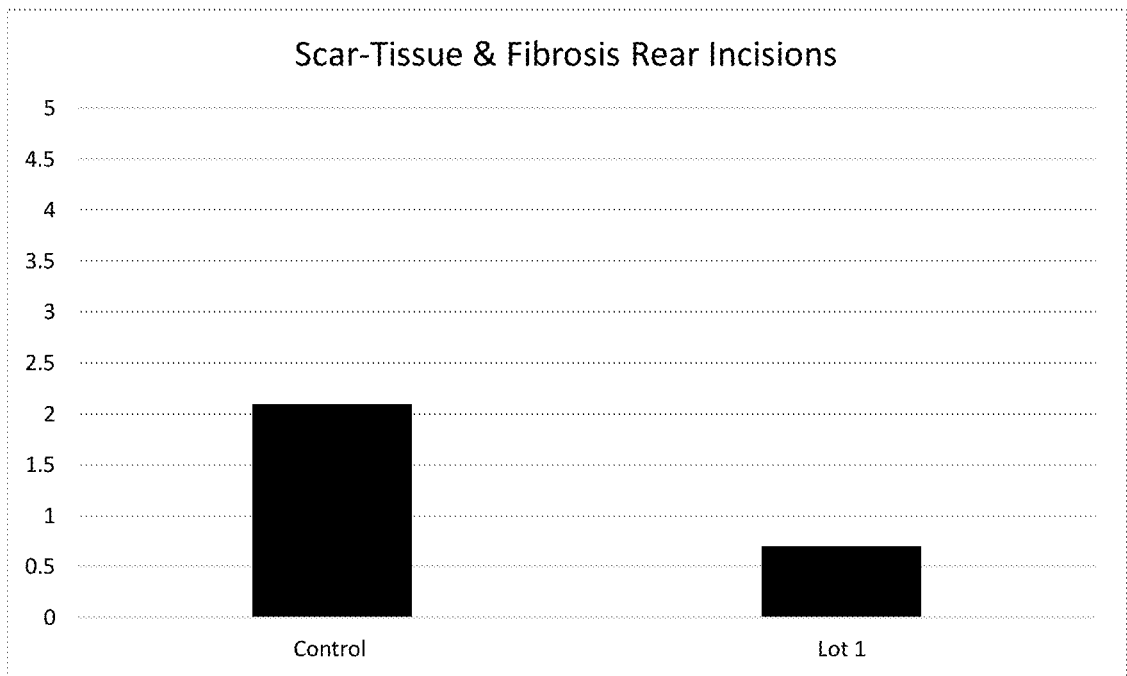
FIG. 3B shows histological analysis of the same study, but for the rear incisions made during the study.
Figure 3C:
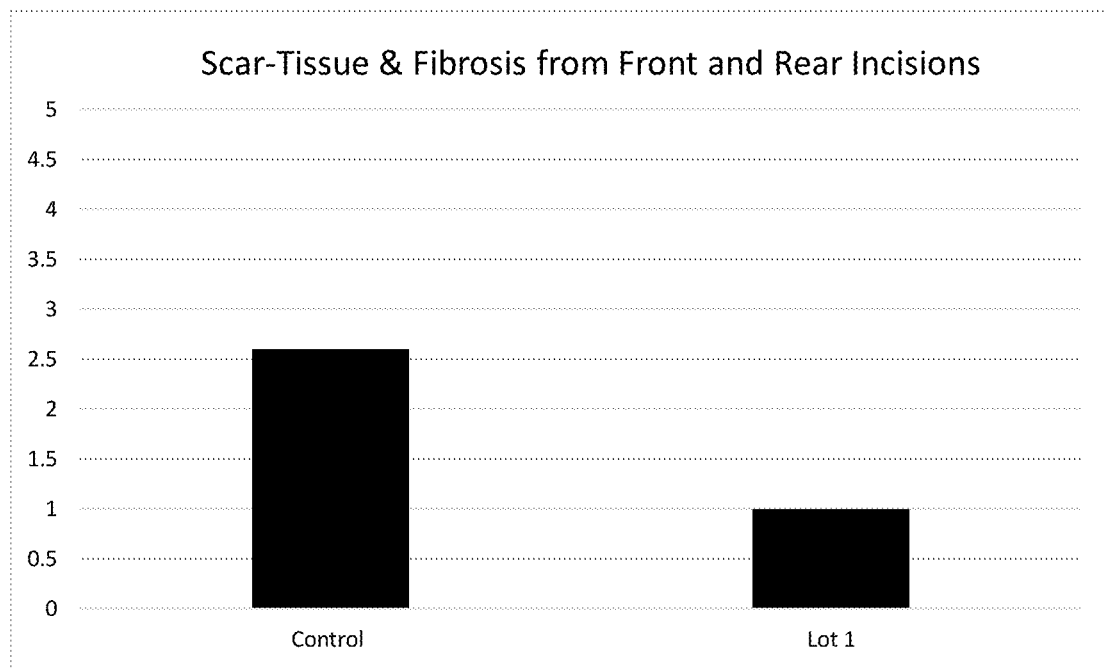
FIG. 3C shows the combined results of the study.

FIGS. 3A, 3B, and 3C depict a histological analysis of a porcine study treating porcine dermal incision injuries with the product having, 0.5 mL amniotic fluid per square centimeter amniotic membrane. Full thickness dermal regeneration and reductions in scar tissue and fibrosis were observed, with significant difference from sutured, non-product controls at both 2 and 10 days post operation. The experimental sites had significantly reduced fibrosis and scarring across all samples as compared to controls, illustrating the effectiveness of treatment with the product.

Figure 4A:
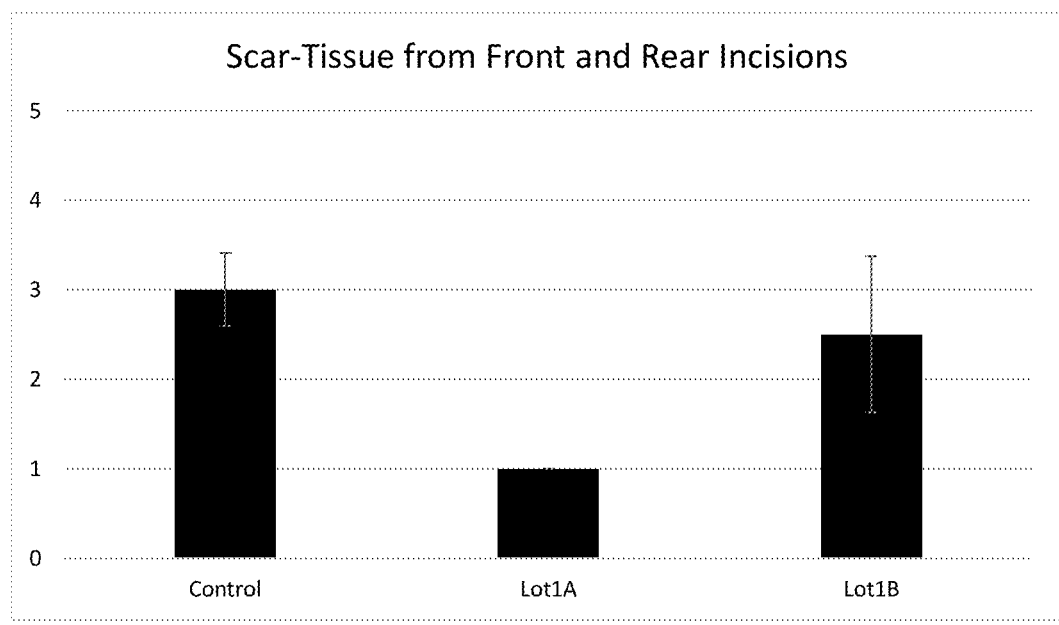
FIG. 4A depicts a histological analysis of a porcine study using two embodiments. Lot1A is 0.5 mL amniotic fluid per square centimeter amniotic membrane. Lot1B is 2.0 mL amniotic fluid per square centimeter amniotic membrane. The figure shows improved scar tissue across experimental samples and particularly at the 0.5 mL/cm2 concentration.

FIG. 4A depicts a histological analysis of the porcine study using two embodiments. Lot1A is 0.5 mL amniotic fluid per square centimeter amniotic membrane. Lot1B is 2.0 mL amniotic fluid per square centimeter amniotic membrane. FIG. 4A shows improved scar tissue across experimental samples and particularly at the 0.5 mL/cm2 concentration. The control sample had histological scoring averaging 3 out of 5, or poor, with significant scarring found in the wound. The 0.5 mL concentration experimental sample showed very strong results, with scarring averaging 1 out of 5, or very good, with little scarring found in the wound. The 2.0 mL concentration sample was less effective than the 0.5 mL concentration sample, but still reduced average scarring to 2.5 out of 5.

Figure 4B:
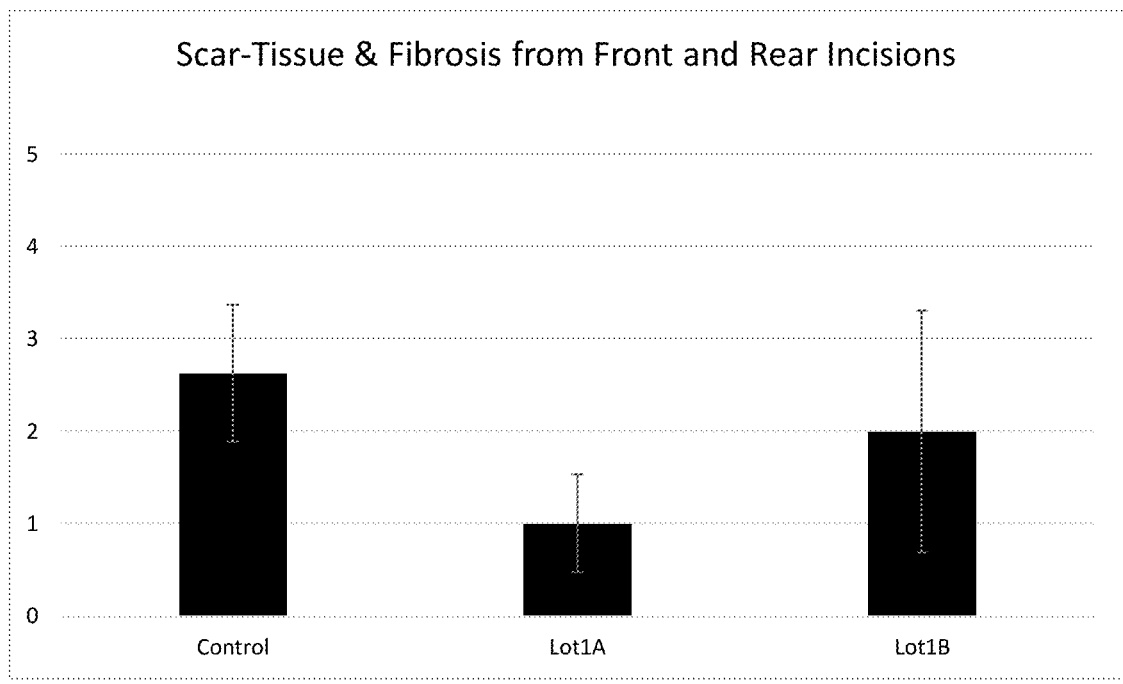
FIG. 4B shows improved scar tissue and fibrosis across experimental samples, and particularly at the 0.5 mL/cm2 concentration.

FIG. 4B shows improved scar tissue and fibrosis across experimental samples. The control sample had histological scoring averaging 3 out of 5, or intermediate scarring and fibrosis. 0.5 mL/cm2 concentration (Lot1A) showed very strong results, with scarring and fibrosis averaging 1 out of 5, or very good, with little scarring or fibrosis found in the wound. The 2.0 mL concentration sample was less effective than the 0.5 mL concentration sample, but still reduced average scarring and fibrosis to 2.0 out of 5.

Figure 4C:
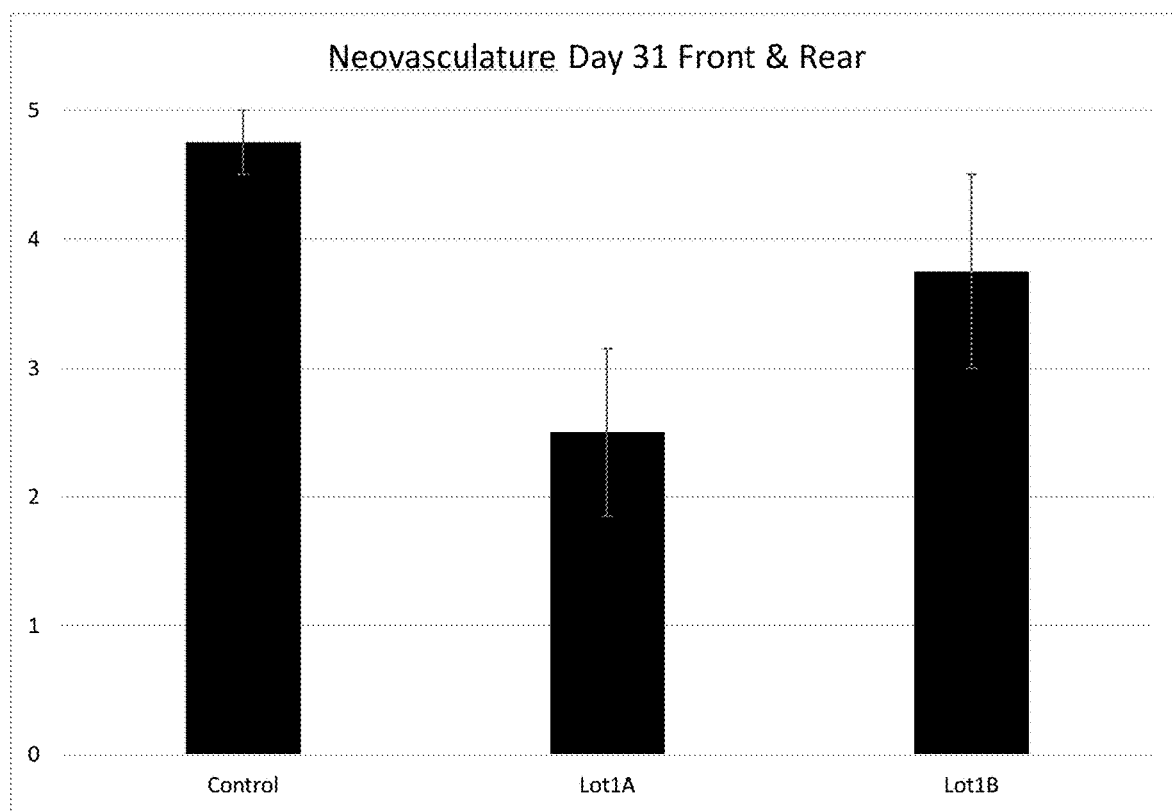
FIG. 4C shows reduced neovascularization across experimental samples at 31 days, and particularly at the 0.5 mL/cm2 concentration.

FIG. 4C shows reduced neovascularization across porcine experimental samples at 31 days. As compared to the control having scoring of nearly 5 out of 5, or extremely poor, the 0.5 mL/cm2 concentration (Lot1A) had greatly improved average scoring of 2.5 out of 5. The 2.0 mL/cm2 concentration (Lot1B) also had improved average scoring of less than 4 out of 5.

FIGS. 4A, 4B, 4C illustrate that certain increased concentrations of amniotic serum may offer improved wound healing scoring and reduced scar tissue, fibrosis, and neovascularization compared to control samples. Further, optimization of this effect may be linked to idealized ratios of amniotic serum to amniotic membrane.

In some embodiments, an amniotic intermediate layer may also be incorporated into the product or may serve as the exclusive or primary scaffold. The amniotic intermediate layer may bind a different array of factors as compared to the amniotic membrane, and may allow additional saturation with growth factors from amniotic plasma or other sources. Further, the amniotic intermediate layer contains proteoglycans and hyaluronic acid, which may be capable of holding water within the wound bed and simultaneously acting as a point-of-interaction/docking for stem cells via CD44. Such an embodiment may provide polymers which may be catabolized to provide resources that may be used to deposit new skin. The intermediate layer can be separated using a scalpel and added at any stage of processing.

In some embodiments, the product may comprise additional treatments or be delivered with additional treatments. For example, in some embodiments medicaments are incorporated into the product.

Processes for Generating an Acellular Product

Manufacturing an acellular product may include processing an amniotic serum, processing an amniotic membrane, and combining those products.

Amniotic serum may be obtained in any number of forms, and may require different levels of processing. Typically, fresh placental tissues may be obtained from a suitable provider, and typically may be stored for less than 12 hours before being packaged on dry ice packs and shipped for processing, with the time period from recovery to reception by the manufacturer occurring generally less than 24 hours. Typically, tissues may be tested for infectious agents or quality before use. Tissues may be processed immediately, or may be maintained for up to 24 hours at 4° C.

Processing the amniotic serum to remove fibrin and red blood cells may improve the effectiveness of the final product, and may be done by any known technique, such as by filtering or mass-based techniques. In some embodiments, amniotic serum may be centrifuged to remove fibrin and red blood cells. Centrifugation may be done, for example, for approximately 10 minutes at around 200 times gravity, or at any speed or for any length of time that allows fibrin clots and red blood cells to migrate to the bottom of the centrifugation column. In some embodiments, inspection of the centrifugation column may indicate a need for further centrifugation to obtain a clear interface between coagulated mass, red blood cells, and plasma. Failure of a sample to form a red blood cell and serum interface may disqualify the sample from further processing.

The plasma portion may be isolated from processed amniotic serum, as outlined above, or may be obtained by any other method. In some embodiments, the plasma portion may be obtained from the centrifugation column by simple pipetting, which may be done without drawing red blood cells and fibrin into the sample.

The centrifuged serum supernatant or alternatively, whole amniotic fluid component may be placed in dialysis tubing, closed and immersed in deionized distilled water. Such a step may lyse any smaller "formed bodies" such as WBCs, platelets, red blood cells, and may enable the rapid diffusion of ions/salts from the mixture.

Alternatively, the serum or total amniotic fluid can be placed in dialysis tubing and submerged in a saline solution considered to be hypertonic (>5%) for any period of time. Such a method may rapidly and efficiently remove a substantial amount of the water content. The serum may become hypertonic and may destroy formed bodies in this fashion, and may serve as a step to prepare the soluble proteins for collection in future steps. The increased salt content of the solution (with respect to water content) may decrease the solubility of proteins, which might be otherwise soluble in water and may otherwise be more difficult to collect. Therefore, this step may reduce the processing time and gravitational force required during future ultracentrifugation steps.

Processing the amniotic membrane may be performed to obtain a decellularized material. In some embodiments, the amniotic membrane may be obtained as an intact membrane, and in other embodiments may be pre-processed into smaller pieces. In a typical embodiment, sheets of amniotic membrane may be removed intact from a saline bath and then processed. In some embodiments, the total surface area of the amniotic membrane and intermediate layers may be measured. In additional embodiments, the chorion layer may be removed prior to processing, which may be performed by shaving or some other technique.

Note that in specific embodiments, an intermediate layer may be used in place of an intact amniotic membrane. In these embodiments, the intermediate layer may be used in the same manner as the membrane.

The amniotic membrane may be typically further decellularized, which may be performed by any method, and in typical embodiments is washed with ethanol to remove residual cell content. The membrane may then optionally be cut or dissected.

In typical embodiments, the amniotic fluid may be added to the membrane in a suitable container, and the membrane may be morselized in the amniotic fluid suspension using any suitable means, such as a needle or punch, though any method of morselization is contemplated.

In some embodiments, the processed amniotic serum may be added to the micronized amniotic membrane at a ratio of 0.01-3.0 mL amniotic serum per square centimeter of amniotic membrane. In a typical embodiment, the processed amniotic serum may be added to the micronized amniotic membrane at a ratio of 0.01-0.1 mL amniotic serum per square centimeter of amniotic membrane. In a specific embodiment, the processed amniotic serum may be added to the micronized amniotic membrane at approximately 0.5 mL amniotic serum per square centimeter of amniotic membrane.

A mechanical method of particulating portions of the amniotic membrane may offer improvements over a freezing and fracturing methods or chemical methods. A chemical method may involve subjecting the proteins of the amniotic membrane to fewer denaturing forces. Typically, membrane particles ranging from approximately 10-400 microns in size are produced, however in some embodiments membrane particles may be produced in a variety of larger and smaller sizes.

An additional benefit of the morselization step is that the membrane may now be able to interact with a larger number of amniotic fluid factors via the several different layers within the now exposed membrane. The morselization may improve saturation with amniotic fluid and its various factors, which may improve the ability of the final product to deliver factors and aid in treatment.

In some embodiments, additional material may be added from an amniotic intermediate layer. The amniotic intermediate layer may contain additional growth factors and other compounds that further promote cellular migration, differentiation, growth, and maturation. The intermediate layer may be separated from an amniotic sample by shaving or removal with a scalpel. The intermediate layer may then be added to the morselized membrane particulate and amniotic serum mixture. Note that in some embodiments, the intermediate layer may be used as the membrane portion itself.

After mixing the intermediate layer into the morselized membrane particulate (as applicable) and amniotic serum mixture, the products may be centrifuged. In some embodiments, centrifugation may be high-speed and low temperature, for example at 1-8 hours at approximately 50,000-100,000,000 times gravity at 4° C. The centrifugation step may pelletize proteins and may separate them from the water and salt content. Further, scaffolds such as membrane and/or intermediate layer may be forced to interact with diffuse proteins in suspension and will allow impregnation of the scaffolds with these factors. After a protein pellet forms at the base of the tube, the supernatant of salt and water may be removed by pipetting or other mechanism. This step may remove greater than 95% of the water and salt content.

In another embodiment, the serum may be centrifuged at 50,000-1,000,0000 times gravity for 2 hours or more without a scaffold component. The insoluble proteins and cellular debris may be removed from the soluble fraction. The supernatant can then be combined with the micronized amnion, and/or intermediate layer for impregnation with an 8 hour ultracentrifugation cycle.

In yet another embodiment, the amniotic serum may have the saline content removed via dialysis for a period of 2 hours in a low molecular weight dialysis tubing submerged in deionized-distilled water. This process may also ablate viable cell populations. The serum may then be centrifuged to remove the cellular debris and insoluble factors. The supernatant, which may be collected, may be recombined with the scaffold without cellular components or salts.

The product may then be prepared to various specifications, and in typical embodiments may be dried through centrifugal evaporation. Such a step may remove remaining water content without the freezing and freeze-drying, thereby preserving protein and scaffold viability. The product may then be terminally sterilized using an irradiation method, peracetic acid method, or other method.

In another embodiment, a short method of processing may involve using high-speed centrifugation and/or ultracentrifugation to remove a bulk of the water content in a fraction of the time it requires to perform the initial centrifugal evaporation step. This method may have the benefit of saturating and impregnating the interaction sites of the scaffold with the appropriate constituents.

In the alternative processing embodiment, a human serum source devoid of fibrinogen may be filtered to remove contaminating cell populations and/or filtered to remove bacterial cells. The serum solution may then be mixed with a biological or synthetic scaffold of a particular size. In some embodiments, the scaffold may comprise a biological scaffold micronized to a range of 50-500 um. In some embodiments, a ratio of amniotic fluid (mL) to amniotic membrane (cm2) may be approximately 0.5 mL/cm2. In other embodiments, the ratio may be approximately 0.01-3.0 mL/cm2. In yet other embodiments, the ratio may be approximately 0.01-0.1 mL/cm2.

In some embodiments, the total solution created may be added with or without establishing a gradient for separation of proteins from lipids. The total solution may then be centrifuged under refrigerated conditions, for example for at least 8 hours at a gravity of at least 50,000 times gravity. The resulting centrifugation pellet may be the desirable scaffold/serum protein product, and additionally includes exosome and microvesicles. The interface formed at the top most portion of the centrifugation column may be the lipid layer, which may be collected by any method, such as pipetting, and the remaining solution may be removed from the centrifuge column and discarded. This step may remove the bulk aqueous content from the desirable protein and scaffold materials.

In such embodiments, the protein pellet embedded into the scaffold by centrifugation may then be collected. In some embodiments, the pellet may be placed into a suitable container for storage and therapeutic use. In other embodiments, residual water may be removed from the pellet through any known method, including but not limited to gentle lyophilization. Because the majority of the water content may have already been removed by centrifugation, the denaturation of desirable proteins and cost of lyophilization may be significantly reduced. Alternatively or subsequently, the pellet may be further centrifuged to remove residual water content and packaged and sterilized for use.

In yet another embodiment, passive impregnation of scaffold and serum may be achieved by mixing the scaffold and processed serum and removing water content by any means. In some embodiments, water content may be removed by nitrogen convection or cryogenic methods. In other embodiments, water content may be removed by centrifugal evaporation.

A final product may be a crystalline solid capable of phase-change with the addition of water. Such a product may have high treatment potential compared to the use of intact tissues.

When dehydrated, the product may be highly shelf stable at room temperature, and may be expected to last 5 years without significant degradation. This is another benefit of the product, as many previous generation products require complex storage and preparation.

In some embodiments, additional treatments or medicaments may be incorporated into one or more of the scaffold, serum, or mixture. For example, additional chemical or medical factors may be added to the scaffold, serum, or mixture prior to processing. In other embodiments, the additional treatments or medicaments are provided after processing.

Additional Processes for Generating an Acellular Product

In particular inventive embodiments, the acellular product and the constituents thereof are never dried and never frozen. For particular biological membranes, a never dried and never frozen product is particularly advantageous as drying and/or freezing, or otherwise attempting to remove 90% to 100% of the fluid content from the biological membrane may render the membrane irreversibly dried (e.g., un-reconstitutable) and therefore difficult to apply for therapeutic use. The intermediate layer, for example, is highly susceptible to this phenomenon. It is contemplated, that due the exceptional hydrophilic nature of the intermediate layer, irreversible bonds form when the layer is completely dehydrated. As such, as previously described herein, processing of a serum/scaffold product may involve using high-speed centrifugation and/or ultracentrifugation to remove a bulk of the water content therefrom without completely drying the scaffold. The resulting partially dehydrated scaffold is then placed in a suitable container for storage and therapeutic use.

Other processes for generating a partially dehydrated impregnated acellular product is also provided herein. In a specific inventive embodiment, an evaporative process is used to generate said acellular product, which includes the following protocol. First, the plasma and amniotic membrane (e.g., a biological membrane and/or intermediate layer) are harvested and/or pre-processed using any of the techniques described herein. Next, the plasma is combined with the amniotic membrane in a suitable container (e.g., vial, conical tube) to form a composition thereof consisting of a plasma portion and a membrane portion. In some embodiments, plasma is combined at a ratio of 0.001-10 mL of plasma per 1 milligram (mg) of membrane and/or 0.001-10 mL of plasma per 1 cm$^2$ of membrane. In other embodiments plasma is combined at a ratio of 0.25-1.5 mL of plasma per 200 milligrams (mg) of membrane and/or 0.25-1.5 mL of plasma per 200 cm$^2$ membrane. While in further embodiments, plasma is combined at a ratio of 0.5 mL of plasma per 200 mg of membrane and/or 0.5 mL of plasma per 200 cm$^2$ of membrane. It is worth noting, that processing the membrane using weight measurements (e.g., milligrams) as opposed to area (e.g., cm$^2$) may be preferable because: a) weighing the membrane is easier to perform; and b) weight measurements account for three-dimensional donor tissue variability (i.e., thickness and area) and therefore standardizes processing between donor samples.

After the plasma and membrane have been combined, the composition is exposed to conditions that partially evaporate fluid (primarily water) therefrom to impregnate and concentrate the amniotic membrane with factors from the plasma portion. The percentage of fluid removal from the composition may be between 1% and 95%, 10% and 80%, and more preferably between 50% and 70%. To achieve that end, a container having the composition therein may be placed in a centrifugal evaporator, where the centrifugal evaporation is operated between 200-1,000 times gravity for 120-240 minutes at 30-40° C. In other embodiments, the composition is simply exposed to heat (e.g., placed in an oven), where the temperature is maintained below protein denaturation temperatures (no greater than 41 degrees Celsius) to maintain the integrity and efficacy of the proteins.

Ultimately, the partial fluid removal step generates an impregnated amniotic membrane that is concentrated/saturated with growth factors at 1.1 to 10 times above normal physiological conditions. The fluid removal step may be performed with evaporation or centrifugation as described above, or by any another process. In a specific embodiment, evaporation is the preferred fluid removal process because evaporation is a more delicate and less forceful process on the components in the composition. More specifically, ultracentrifugation may unintentionally collapse the structure of the membrane and form irreversible bonds, which may create a less effective scaffold comparatively. However, it will be appreciated that ultracentrifugation has a processing time advantage compared to evaporation.

In some embodiments, the above impregnated amniotic membrane may be collected and ready for therapeutic use, as is. In other embodiments, the impregnated amniotic membrane is collected and plasma is added thereto to store and preserve the membrane prior to therapeutic use, where the final and ready-to-use product is the composition of the added plasma and impregnated amniotic membrane. Since it may be advantageous to never freeze or dry certain membranes (e.g., intermediate layer), typical lyophilization and drying techniques to store traditional placental products are futile for these membranes. Therefore, in-house experimental data has shown plasma to be an excellent preservation substitute and carries with it several advantages. First, plasma, and more particularly amniotic serum/fluid, has inherent antimicrobial properties to act as a bacteriostatic and/or bactericide. This may negate the need to irradiate or sterilize the product. Second, plasma contains protease inhibitors that protect and preserve the membrane structure from degradation. Further, the free factors from the plasma portion are immediately released into the wound site when the product is deployed. And finally, the final product is ready to use as is, with no need to reconstitute or special storage conditions. The final product may be stored and ready-for-use in a vial where the end-user simply removes the cap of the vial and deposits the product directly in the wound.

The plasma may be added to the impregnated amniotic membrane at various ratios. In one embodiment, plasma is added to the impregnated membrane at a ratio of 0.001-10 mL of plasma per 1 mg of impregnated membrane. In another embodiment, the ratio is 0.1-1.5 mL of plasma per 200 mg of membrane. In a further embodiment, plasma is added to the impregnated amniotic membrane at the same ratio as the amount of plasma that was added to the membrane prior to the partial dehydration step. For example, if plasma is originally added at a ratio of 0.5 mL plasma per 200 mg of membrane prior to the fluid removal step, then 0.5 mL of plasma is added back to the 200 mg of membrane after the fluid removal step.

In particular inventive embodiments, the amniotic membrane as described above is the intermediate layer, and the intermediate layer alone. The intermediate layer is a particularly advantageous scaffold due to its conformability and hydrophilicity. The gelatinous nature of the intermediate layer permits the layer to conform to the shape of the wound. The hydrophilicity of the layer may improve cell mobility, increase the available binding sites for growth factors, and provide a scaffold that is readily biodegradable. In some embodiments, as previously described herein, the final product comprises intermediate layer stored with amniotic serum/fluid. In other embodiments, the final product comprises an impregnated immediate layer impregnated with amniotic fluid by way of a fluid removal step, and then stored with amniotic serum/fluid. The final product may include a ratio of 1 mg of intermediate layer, impregnated or not, with 0.001-10 mL of amniotic serum/fluid. In other embodiments, the final product includes a ratio of 100-300 mg intermediate layer, impregnated or not, with 0.25-1.5 mL of amniotic fluid. In a further embodiment, the final product includes a ratio of 200 mg of intermediate layer, impregnated or not, with 0.5 mL of amniotic fluid. In specific embodiments, the ratio may be adjusted based on an observation that 200 mg of intermediate layer fills an average wound of about 5 centimeters (cm) in length at a standard depth ~2-3 cm.

In addition, the intermediate layer is preferably not particulated, morselized, or otherwise micronized. As previously described herein, the amniotic membrane may or may not be particulated. As is known in the art, low molecular weight glycosaminoglycans and collagen fibrils, of which the intermediate layer is primarily composed, may elicit a proinflammatory response. A proinflammatory response may decelerate the healing process and increase the probability of scar formation. Therefore, in some embodiments, the intermediate layer is maintained in its gelatinous form. Further, treating a wound with the intermediate layer in its gelatinous form may be more efficacious than a particulated biological membrane because particles in suspension may not act like a conformable scaffold.

Processes for Producing a Passively Impregnated Acellular Product

In specific inventive embodiments, a passively impregnated acellular product is generated by the following process. First, the plasma (e.g., amniotic fluid) and amniotic membrane (e.g., a biological membrane and/or intermediate layer) are harvested and/or pre-processed using any of the techniques described herein. The native amniotic membrane is rinsed/washed to clean the membrane of surface contaminants. The membrane is preferably maintained in its native state and never frozen or dried. The membrane is weighed and/or measured and set aside while processing the plasma. The plasma may be filtered or un-filtered prior to undergoing a partial dehydration step. Partial dehydration of the plasma may occur with any of the dehydration steps described herein (e.g., heat, centrifugal evaporation). In a particular inventive embodiment, the plasma is partially dehydrated in a centrifugal evaporator. In some embodiments, a bulk amount of plasma is partially dehydrated in one step, while in other embodiments individual aliquots of plasma are partially dehydrated. The percentage of fluid removal from the plasma may be between 1% and 95%, 10% and 80%, and more preferably between 50% and 70%. To achieve that end, a container having the plasma therein may be placed in a centrifugal evaporator, where the centrifugal evaporation is operated between 200-1,000 times gravity for 120-240 minutes at 30-40° C.

After the plasma has been partially dehydrated, the final passively impregnated acellular product may be assembled. The desired weight/surface area of amniotic membrane is combined with a desired volume of partially dehydrated plasma to form a final composition thereof. In some embodiments, the ratio of plasma to membrane is 0.001-10 mL of plasma per 1 $cm^2$ of membrane. In other embodiments plasma is combined at a ratio of 0.25-1.5 mL of plasma per 200 milligrams (mg) of membrane and/or 0.25-1.5 mL of plasma per 200 $cm^2$ membrane. While in further embodiments, plasma is combined at a ratio of 0.5 mL of plasma per 200 mg of membrane and/or 0.5 mL of plasma per 200 $cm^2$ of membrane. The final composition is then packaged and ready for therapeutic use. Overtime, the membrane becomes passively impregnated with factors as the factors bind with target sites on the membrane. Thus, in this process, the same plasma acts as the storage media as well as the impregnation media.

In specific inventive embodiments, the amniotic membrane is intermediate layer, and intermediate layer alone, based on the aforementioned advantages of intermediate layer (e.g., conformability, hydrophilicity, absorbability). In addition, the intermediate layer is preferably not particulated, morselized, or otherwise micronized for the reasons described above. Further, it is worth noting that a passively impregnated IL may not bind as many biological factors as an actively impregnated IL (removal of fluid from an AF+IL mixture), while in other scenarios a passively impregnate IL may bind the same amount of factors but over a longer time period than an actively impregnated IL.

Confirmation of Increased Protein Concentration with Impregnation Techniques

Figure 5A:
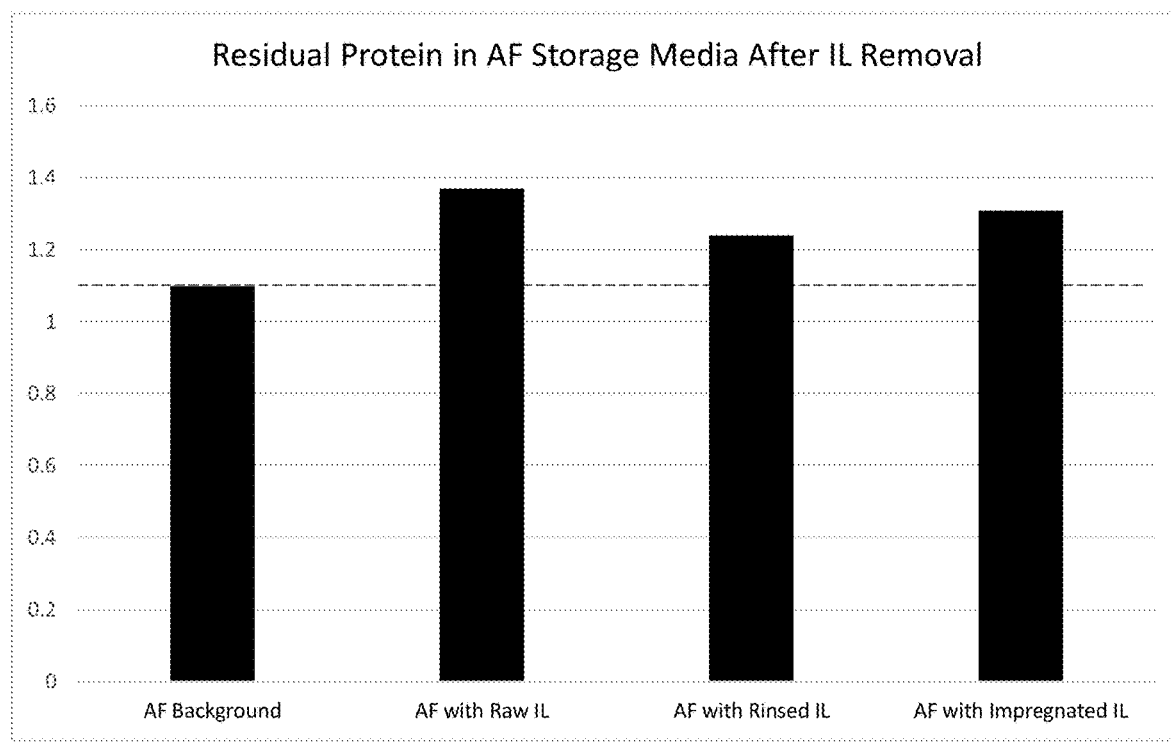
FIGS. 5A and 5B depict the results of two protein assays confirming an increase in protein concentration on a biological membrane using the impregnation techniques described herein.
Figure 5B:
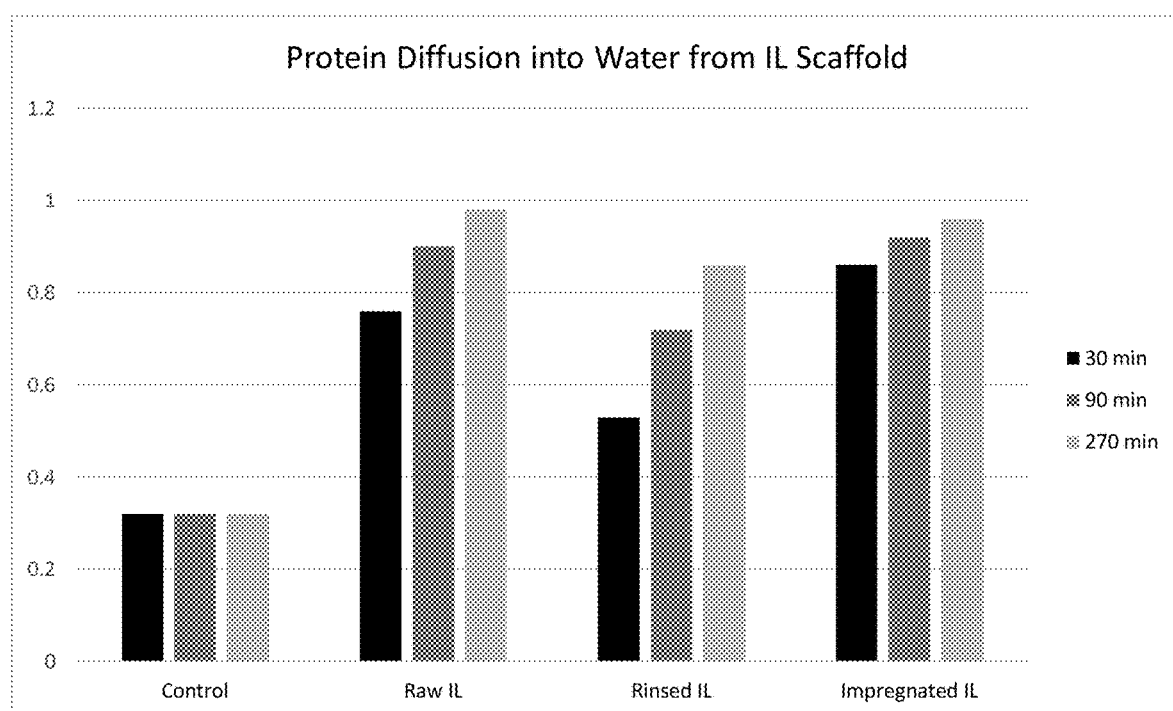

FIGS. 5A and 5B depict the results of two protein assays confirming an increase in protein concentration on a biological membrane using the impregnation techniques described herein. The results shown in FIG. 5A were generated with the following protocol. Three intermediate layer (IL) products were prepared along with one control group. The control group consisted of amniotic fluid (AF) alone, which was used as the storage media for the three IL products. This provided the protein quantity contributed by the amniotic fluid storage media alone. The first IL product was prepared by harvesting the IL from the amnion and chorion and placing this raw IL into a vial of storage media. The second IL product was prepared by harvesting and rinsing/washing the IL prior to placing the rinsed IL in a vial of storage media. The third IL product was prepared by harvesting, rinsing/washing, and impregnating the IL in AF using the methods described herein (more specifically, the removal of amniotic fluid via evaporation from an AF+IL mixture) before placing the impregnated IL in a vial of storage media. The intermediate layer and amniotic fluid above were all harvested from the same donor. After 2 weeks, the raw IL product, the rinsed IL product, and the impregnated IL product were removed from their respective vials. A sample of the storage media from each vial was collected and assayed for protein quantity using a basic Coomasie stain. As shown in FIG. 5A, the residual protein quantity in the storage media for each IL product were similar. Thus, the impregnated IL product released a similar quantity of proteins as the other products and stabilized to a similar concentration. There was no excessive diffusion of proteins from the impregnated IL, which means all of the proteins impregnated with the IL (minus the proteins that diffused) are available for therapeutic use in the impregnated IL.

The results shown in FIG. 5B were generated with the following protocol. The raw IL product, the rinsed IL product, and the impregnated IL product were removed from their respective storage media and each placed in 1 mL of water. A control sample of water was also included. For each preparation, 5 microliters of water was collected at 30 minutes, 90 minutes, and 270 minutes, and assayed for protein quantity using a basic Coomasie stain. Based on the results, the diffusion rate of the proteins from the impregnated IL product was faster than the other two products. The impregnated IL product has a large and immediate release of proteins into the water and does not change much from 30 minutes to 270 minutes, which indicates the solution reaching a saturation point. Based on the laws of diffusion, the rate of diffusion is proportional to the concentration gradient. A faster rate of diffusion suggests a higher concentration gradient. Therefore, the results of the study show that the impregnated IL contains a higher concentration of proteins than the raw intermediate layer, and especially higher than the rinsed intermediate layer.

It should be appreciated, that all tissue products in the industry undergo some sort of a rinse/wash step. When harvested, the intermediate layer is covered in blood and surface contaminants. As the intermediate layer may be used for therapeutic use in this condition, the rinse/wash is best practice. Additionally, the blood and surface contaminants may contain non-therapeutic or neutral proteins. By rinsing the intermediate layer and subsequently impregnating the IL in a fluid having known therapeutic proteins, the overall efficacy of the product is improved. Further, it is noted that a comparison of the impregnated intermediate layer to the rinsed intermediate layer is important because the data shows the impregnation method does in fact impregnate the intermediate layer with therapeutic proteins from the amniotic fluid after a rinse/wash step.

Processing of Amniotic Fluid as a Product

In particular inventive embodiments, dehydrated amniotic fluid alone is provided as a product. The amniotic fluid may be partially or fully dehydrated using any of the methods described herein. In some embodiments, the amniotic fluid is filtered, while in other embodiments the amniotic fluid is un-filtered. The amniotic fluid may be ultracentrifuged to pellet the growth factors in the amniotic fluid, where the supernatant is subsequently decanted. The pellet of growth factors may be re-suspended in a fluid to obtain a final concentration of growth factors in the fluid. The re-suspension fluid may be the decanted supernatant. In a specific embodiment, the amniotic fluid is partially or fully dehydrated in a centrifugal evaporator. In particular embodiments, a combination of filtering, dialysis, ultracentrifugation, centrifugation, and/or centrifugal evaporation is used to produce the amniotic fluid product. In some embodiments, the amniotic fluid is fully dehydrated in a centrifugal evaporator to produce the final product, where the amniotic fluid is dried below protein denaturation temperatures. The final fully dehydrated amniotic fluid product may then be re-constituted prior to use. In other embodiments, the amniotic fluid is partially dehydrated and provided as the ready-to-use therapeutic product. The amniotic fluid is preferably never frozen when processing or storing the amniotic fluid product.

Methods of Treatment

The products may be useful to treat a number of injuries and diseases. In some embodiments, an acellular product may be used as a medicament in the treatment of dermal wounds. In some embodiments, the dermal wound may be an incision wound, such as a surgical site wound.

The product may be applied in a number of forms. One version may be as powder or gel, which may be reconstituted from a powder by a practitioner. Typically, application of the product occurs prior to wound closure, however in some embodiments the product may be applied after wound closure. In some embodiments, the product may be applied only once to the wound site, while in other embodiments is the product may be applied more than one time over a certain time period. If applied over a time period, the product may be applied, for example, hourly, two or more times a day, daily, weekly, bi-weekly, or monthly.

In some embodiments, the product may be used to treat a human subject. In other embodiments, the product may be used to treat an animal, such as a domesticated pet, work, or food animal.

In some embodiments, the product may be mixed with or otherwise delivered or used with other compounds or treatments.

In dermal treatment embodiments, treatment with the product may improve one or more disease or injury states. Exemplary metrics include wound healing time, prognosis, outcome, cost of treatment, or evaluation of markers such as scar tissue evaluation and quality of tissue healing.

EXAMPLES

The following examples are provided to illustrate aspects of the invention, and in no instance should be considered to limit the scope of the claims.

Example 1: Obtaining Placental Tissue and Quality Assurance

Placental tissue may be obtained by any known method. Fresh placental tissue specimens may be obtained from providers. Ideally, specimens are to be stored for less than 12 hours before being packaged on dry ice packs and shipped for processing, with the time period from recovery to reception by the manufacturer occurring in no more than 24 hours. In all cases, tissues are to be handled in accordance with the validated protocols of the processing facility, and are to be tested for infectious agents prior to use. The integrity of the biological containment vessels and contents are verified prior to use, and tissues are processed immediately or maintained for up to 24 hours at 4° C. to ensure safety and effectiveness.

Example 2: Processing and Decellularization of Amniotic Serum

Note that all of the processing use sterile/aseptic techniques and containment to ensure safety and effectiveness.

During shipping, the amniotic fluid may typically be placed in dialysis tubing and submerged in a stabilization media of glucose, saline, ethanol, sucrose, water or a combination thereof in the range of 0.5%-10% of any component. The media may remove water content, increase solubility of factors in the serum, or challenge the integrity of formed bodies (cells). Alternatively or additionally, low-temperature (less than about 4° C.) dialysis in ethanol may be used. Dialysis techniques may also adjust the isoelectric constant and increase protein collection efficiency if desired.

Amniotic serum is aliquoted into 50 mL centrifuge tubes, avoiding any coagulated fibrin. The samples may be loaded into a centrifuge according to standard laboratory procedure, and ran for at least 10 minutes at approximately 200×g.

The tubes may be carefully removed and placed in a tube rack so as to not disrupt the red blood cell and serum interface. The quality of the interface may be inspected, and verified to be distinct with no intermediate space. If the interface is not distinct, the sample may be centrifuged at approximately 1500 RPM for an additional 3 minutes. Further failure to form a red blood cell and serum interface requires considering the disqualification of the sample.

Tubes and tube rack may be sprayed with 70%+ isopropanol alcohol diluted in distilled water and transferred into the prepped/cleaned work space. The entire plasma portion from each tube may be isolated using a serological pipette (5 mL or 10 mL capacity), taking caution to not draw any red blood cells into the pipette. The remaining non-plasma portion contains the remaining cellular content and fibrin.

Example 3: Processing of Amniotic Membrane

Containers may be prepped according to standard safety protocols (70% isopropanol) and transferred to work space, then the membranes may be removed from the saline bath in which they typically arrive.

The total surface area of the amniotic membrane and intermediate layers may be measured and inspected to ensure that the chorion is removed. Gently wash each layer with 70% ethanol to remove residual red blood cells and decellularize the membranes.

Cut the membrane into quarters and transfer each quarter of the membrane into a 50 mL conical tube.

Add previously obtained amniotic fluid up to 40 mLs. In two examples generated herein, amniotic fluid was added at 0.5 mL per square centimeter of membrane and 2.0 mL per square centimeter of membrane.

Morselize the membrane in the amniotic fluid suspension using an OmniTip for 2 minutes. This allows the production of particulate/particulated amniotic membrane without freezing it. The membrane also interacts with a larger number of amniotic fluid factors via the several different layers within the now exposed membrane.

Membrane particles ranging from approximately 10-400 microns in size are produced.

Example 4: Processing of Fluid/Scaffold Particulate Mixture

The morselized membrane particulate generated in Example 3 may be transferred to total amniotic serum at a ratio of 0.01-0.1 mL amniotic serum per square centimeter of micronized amniotic membrane as determined in Example 3.

The intermediate layer may be added into the mixture in the same sized aliquot as the amniotic membrane particulate. Aliquot the mixture into 50 mL conical tubes and centrifuge for approximately 8 hours at 80,000-100,000 times gravity at 4° C. Ensure that a protein pellet has formed at the base of the tube, and if so pipette the remaining supernatant solution out.

Aliquot the remaining wet pellet into individual serum vials (typically ranging from 0.5-1.0 g size) and cover the vials with a tyvex barrier before subjecting to centrifugal evaporation for 3-6 hours.

Example 5: Alternative Processing Method

Amniotic serum is aliquoted into 50 mL centrifuge tubes, avoiding any coagulated fibrin. Filter to remove any contaminating cell populations and optionally to remove bacterial cells. The samples are then mixed with a scaffold such as particulated amniotic membrane or intermediate membrane without particulated amniotic membrane. This may be centrifuged under refrigerated conditions for >8 hours at 50,000 times gravity.

Verify that the topmost (lipid) interface is formed. Remove the topmost layer via pipetting. Decant or pipette the remaining solution from the centrifuge tube and discard, removing the bulk aqueous content.

Collect the remaining material and evaluate aqueous content. Either carry out centrifugal evaporation as above or directly store as above.

Example 6: Terminal Sterilization, Storage, and Distribution

Remove the vials generated as in examples 3 or 4 and terminally sterilize using irradiation or peracetic acid.

Discard waste products in appropriate biohazard containers, and ensure lot number and manufacture dates are documented. The product may be stored at ambient temperature for up to 5 years.

Example 7: Treatment of Dermal Incision Wounds Using the Product

Three full dermal surgical incisions 5 cm in length were made on each of the shoulder and rear areas of anesthetized porcine subjects using a surgical blade and full dermal thickness biopsies were introduced. Incisions were examined for consistency, ensuring that the incision penetrated the full dermal thickness. One site on each front and rear area was labeled a control site, and the other two on each front and rear area were immediately treated with concentrations of the acellular product wound covering.

The wound sites were observed and recorded at 2 days post operation and 10 days post operation. At 10 days post operation, the porcine subjects were culled, and the wound areas were subjected to histological analysis using hematoxylin and eosin staining. As shown in FIGS. 3A, 3B, and 3C, the experimental sites had significantly reduced fibrosis and scarring across all samples as compared to controls.

The acellular product-treated shoulder incisions had markedly reduced scar tissue and fibrosis, with an overall score of around 1, while the control incision had a score of around 3. The acellular product-treated rear incisions also had an overall score of below 1, while the control incision had a score of over 2. With respect to scar tissue alone, experimental sites had overall scar-tissue scores of 0.5 and 1.0, while the control site had a scar-tissue score of 3.5. Additionally, reduced neovascularization was noted for experimental sites.

This experiment illustrates the accelerated and improved healing of dermal wounds treated with a single application the products disclosed herein.

Example 8: Processing of an Acellular Amniotic Product with Evaporation

Placental tissue and amniotic fluid may be received by any known method including the methods described in Examples 1 and 2. The placental tissue and amniotic fluid may be received in separate containers.

Processing of the placental tissue begins by exposing the placental tissue to a dilute solution of antibiotics (e.g., gentamycin) for 15-30 minutes at ambient temperatures to clean the surfaces of any contaminants. The placental tissue is then washed in 1 Liter (L) of water to further clean off any blood and other contaminants. Next, the amniotic membrane is separated from the chorion membrane using techniques known the art. This step exposes the intermediate layer. The intermediate layer is then harvested from the amnion and chorion membrane using the edge of a razor blade, cell scraper, scalpel, or other instrument having an edge. The harvested intermediate layer is subsequently soaked and strained three times in water to further clean the layer. After which, the intermediate layer is weighed and separated into final desired mass amounts for further processing. For example, the intermediate layer may be weighed and separated into 200 mg aliquots and placed in separate vials.

The intermediate layer may then undergo a first fluid removal step. The first fluid removal step is intended to remove excess fluid binding to the intermediate layer. This step is optional, but may be preferred as the excess fluid may otherwise dilute the final concentration of growth factors. The first fluid removal step may include centrifuging the vials at 200 times gravity for a few minutes and then decanting or pipetting the excess fluid therefrom.

Processing of the amniotic fluid may or may not include filtering the whole amniotic fluid through a sub-micron filter to remove any lipids. In some instances, the amniotic fluid is processed as described in Example 2, while in other instances the received amniotic fluid is used as is without any additional processing.

The aforementioned amniotic fluid is then added to the intermediate layer. The amniotic fluid may be added directly to the vials containing the intermediate layer. The amniotic fluid may be added to the intermediate layer at a ratio of 0.25-1.5 mL of amniotic fluid per 200 mg of intermediate layer, and more preferably at a ratio of 0.5 mL of amniotic fluid per 200 mg of intermediate layer.

The composition may then undergo a second fluid removal step. The vials may be placed into a centrifugal evaporator to remove fluid therefrom without completely drying the intermediate layer. Theoretically, anywhere between 1% and 95% fluid removal generates an impregnated intermediate layer, meaning the intermediate layer is concentrated/saturated with growth factors above normal physiological conditions. Preferably, about 10%-80% of fluid is removed, and more preferably, about 50%-70%. A suitable amount of fluid removal may be accomplished by centrifuging the vials in the centrifugal evaporator at 40° C. for 120 minutes at 500 times gravity.

After the second fluid removal step, the intermediate layer may be collected and placed into a final vial. Amniotic fluid, whether it be whole, filtered, or processed is added to the intermediate layer in the final vial for storage and preservation. The ratio of amniotic fluid added to the impregnated intermediate layer may be equal to the ratio of amniotic fluid added to the intermediate layer prior to the second fluid removal step. Once the amniotic fluid is added, the vial is capped and ready for therapeutic use.

Example 9: Bulk Processing of an Acellular Amniotic Product with Evaporation The capacity of a particular centrifugal evaporator may limit how many samples are processed at a given time, which may greatly increase the overall processing time. Therefore, a bulk processing method has been developed to increase product output.

The intermediate layer may be harvested and cleaned as described in Example 8. The harvested intermediate layer is then weighed to obtain a total weight. The intermediate layer is then separated into equal weights based on the available space in the evaporator. For example, if the evaporator can process six 50 mL conical tubes, then the intermediate layer is separated into six aliquots, all of which are the same weight. The intermediate layer may then undergo a first fluid removal step as described in Example 8.

Amniotic fluid, processed or not, is then added to each 50 mL conical tube. The amount of amniotic fluid added to the intermediate layer is determined based on the following equation.

$$\frac{\text{(Total Weight of } IL\text{)}}{\text{(Desired Product Weight of } IL\text{)}} * \text{(Desired product volume of } AF\text{)} = \text{Total } AF \text{ needed}$$

Here, IL refers to the intermediate layer and AF refers to amniotic fluid. The total volume of amniotic fluid is then divided by the number of conical tubes. This amount is then added to each conical tube.

The compositions of the intermediate layer and amniotic fluid undergo a second fluid removal step to partially remove fluid therefrom without drying the intermediate layer. A suitable amount of fluid removal may be accomplished by centrifuging the tubes in the centrifugal evaporator at 40° C. for 7 hours at 500 times gravity. Even though the evaporation time is longer, the overall mass of intermediate layer processed for one evaporation cycle is much greater than the mass of intermediate layer processed using the technique described in Example 8.

After the second fluid removal step, the intermediate layer is weighed and separated into final mass amounts (e.g., 200 mg) and placed in a final vial. Amniotic fluid is then added to the final vials at the desired final amniotic fluid amount (e.g., 0.5 mL) for storage and preservation. The vials are capped and ready for therapeutic use.

Example 10: Processing of a Passively Impregnated Acellular Product

Placental tissue and amniotic fluid may be received by any known method including the methods described in Examples 1 and 2. The placental tissue and amniotic fluid may be received in separate containers.

Processing of the placental tissue begins by exposing the placental tissue to a dilute solution of antibiotics (e.g., gentamycin) for 15-30 minutes at ambient temperatures to clean the surfaces of any contaminants. The placental tissue is then washed in 1 Liter (L) of water to further clean off any blood and other contaminants. Next, the amniotic membrane is separated from the chorion membrane using techniques known the art. This step exposes the intermediate layer. The intermediate layer is then harvested from the amnion and chorion membrane using the edge of a razor blade, cell scraper, scalpel, or other instrument having an edge. The harvested intermediate layer is subsequently soaked and strained three times in water to further clean the layer. After which, the intermediate layer is weighed and separated into final desired mass amounts for further processing. For example, the intermediate layer may be weighed and separated into 200 mg aliquots and placed in separate vials.

The intermediate layer may then undergo a first fluid removal step. The first fluid removal step is intended to remove excess fluid binding to the intermediate layer. This step is optional, but may be preferred as the excess fluid may otherwise dilute the final concentration of growth factors. The first fluid removal step may include centrifuging the vials at 200 times gravity for a few minutes and then decanting or pipetting the excess fluid therefrom.

Processing of the amniotic fluid may or may not include filtering the whole amniotic fluid through a sub-micron filter to remove any lipids. In some instances, the amniotic fluid is processed as described in Example 2, while in other instances the received amniotic fluid is used as is without any additional processing. The filter or un-filtered amniotic fluid is placed in a container to undergo a partial dehydration step to concentrate the factors in the plasma. The container may be placed into a centrifugal evaporator to remove fluid therefrom without completely drying the intermediate layer. Preferably, about 10%-80% of fluid is removed, and more preferably, about 50%-70%. A suitable amount of fluid removal may be accomplished by centrifuging the vials in the centrifugal evaporator at 40° C. for 120 minutes at 500 times gravity.

The intermediate layer and partially dehydrated amniotic fluid is combined to form a final composition thereof. The amniotic fluid may be added to the intermediate layer at a ratio of 0.25-1.5 mL of amniotic fluid per 200 mg of intermediate layer, and more preferably at a ratio of 0.5 mL of amniotic fluid per 200 mg of intermediate layer. The final composition is stored for therapeutic use. Overtime, the intermediate layer becomes passively impregnated with factors from the concentrated plasma.

The preceding description is presented for purposes of illustration and description, and does not limit the scope of the invention to the disclosures, examples, and embodiments provided therein. On the contrary, a number of modifications and variations are possible based on the above teachings, and alternative embodiments are included to the full scope allowable by the prior art. Further, it is to be understood that in instances where a range of values are provided that the range is intended to encompass not only the end point values of the range but also intermediate values of the range as explicitly being included within the range and varying by the last significant figure of that range. By way of example, a recited range of 1 to 4 is intended to include 1-2, 1-3, 2-4, 3-4, and 1-4.

The invention claimed is:

1. A method of treating a wound in a human or animal, said method comprising:
    applying an acellular placental product to the wound site, said acellular placental product comprising a human amniotic plasma portion and an intact intermediate layer scaffold membrane portion;
    said intermediate layer being isolated from human amniotic membrane;
    said intact intermediate layer scaffold membrane portion being impregnated with said human amniotic plasma portion.
2. The method of claim 1, said wound being a dermal wound.
3. The method of claim 1, said wound being an incision wound.
4. The method of claim 1, said wound being a surgical scar.
5. The method of claim 1 said wound being a deep narrow wound.
6. The method of claim 1, wherein said plasma portion comprises extracellular matrix.
7. The method of claim 1, wherein said plasma portion comprises one or more adjuvant factors.
8. The method of claim 7, wherein said one or more adjuvant factors comprise at least one growth factor.
9. The method of claim 1, comprising substantially no fibrin or fibrinogen.

* * * * *